(12) United States Patent
Hiramatu et al.

(10) Patent No.: US 8,664,883 B2
(45) Date of Patent: Mar. 4, 2014

(54) LED LIGHTING DEVICE WITH CHOPPER CIRCUIT AND DIMMING CONTROL METHOD

(75) Inventors: Akinori Hiramatu, Nara (JP); Hiromitsu Mizukawa, Suita (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 13/187,321

(22) Filed: Jul. 20, 2011

(65) Prior Publication Data

US 2012/0019714 A1    Jan. 26, 2012

(30) Foreign Application Priority Data

Jul. 20, 2010  (JP) .................................. 2010-163428
Sep. 13, 2010  (JP) .................................. 2010-204340

(51) Int. Cl.
H05B 37/02    (2006.01)
(52) U.S. Cl.
USPC ........................................ 315/291; 315/308
(58) Field of Classification Search
USPC .................................... 315/209 R, 291, 308
See application file for complete search history.

(56) References Cited

U.S. PATENT DOCUMENTS

| | | | |
|---|---|---|---|
| 7,649,327 B2 * | 1/2010 | Peng | 315/312 |
| 8,143,805 B2 * | 3/2012 | Peng | 315/291 |
| 2012/0299499 A1 * | 11/2012 | Peng | 315/210 |

FOREIGN PATENT DOCUMENTS

| | | |
|---|---|---|
| JP | 2001313423 | 11/2001 |
| JP | 20053522393 | 7/2003 |
| JP | 2005294063 | 10/2005 |

* cited by examiner

*Primary Examiner* — Thuy Vinh Tran
(74) *Attorney, Agent, or Firm* — Waddey Patterson; Mark J. Patterson; Gary L. Montle

(57) ABSTRACT

A lighting device is provided for lighting control of an LED module based on an externally provided dimming control signal. A chopper circuit includes a switch coupled across a DC input and an inductor which receives and stores energy when the switch is turned on, and discharges energy to the LED module when the switch is turned off. A control circuit determines a current value to the switch, and compares the current value to a predetermined value. During normal operation, the switch is turned off when the detected current value reaches the predetermined value and turned back on when inductor discharge has completed. During a dimming operation, the normal operation is intermittently disabled in accordance with the dimming control signal. The dimming control signal may be a low-frequency PWM signal, with the lighting output being dimmed as a result of a duty ratio of the PWM signal.

20 Claims, 17 Drawing Sheets

FIG. 16(a)  FIG. 16(b)

LED LIGHTING DEVICE WITH CHOPPER CIRCUIT AND DIMMING CONTROL METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which are hereby incorporated by reference: Japanese Patent Application Numbers JP 2010-163428 filed on Jul. 20, 2010, JP 2010-184909 filed on Aug. 20, 2010, JP 2010-207583 filed on Sep. 16, 2010, and JP 2010-204340 filed on Sep. 13, 2010.

BACKGROUND OF THE INVENTION

The present invention relates to a lighting device and associated circuitry for lighting and dimming a semiconductor light-emitting element such as a light emitting diode (LED) or a plurality of the same forming an LED module. More particularly, the present invention relates to an LED lighting device effective to provide a dimming operation based on externally provided PWM dimming signals, and illumination fixtures or video cameras utilizing the same.

An exemplary LED lighting device as conventionally known in the art, and as represented in FIG. 7, may include a switching element Q1 which is coupled in series to a direct-current (DC) power source 2, and an inductor L1 coupled in series with the switching element Q1 and to which an current flows from the DC power source 2 when the switching element Q1 is turned on. Energy stored in the inductor L1 (or equivalent inductive element) when the switching element Q1 is turned on is discharged to a semiconductor light-emitting element 4 via regeneration diode D1 when the switching element is turned off. A current detector R1 detects an current flowing to the switching element Q1. A control circuit is configured to turn the switching element Q1 off when the detected current reaches a predetermined value (i.e., an on-voltage of transistor Tr1) and to turn the switching element Q1 on when the energy discharge of the inductor L1 is completed (when a diode D2 is turned off). However, a LED lighting device so configured does not typically support a dimming function.

FIG. 13 shows an example of a conventional LED lighting device which is capable of supporting a dimming function and which (a) controls a switching element Q1 to be turned off when an current flowing to an inductor L1 reaches a predetermined value, and (b) controls the switching element Q1 to be turned on when an current is fully discharged from the inductor L1 to a semiconductor light-emitting element 4 via a regeneration diode D1. The lighting device controls the average value of the current flowing to the LED 4 to be constant based on a reference voltage Vref1 by improving the input power factor. Dimming of the LED 4 can also or alternatively be controlled by adjusting the reference voltage Vref1. A lighting device so configured can control the average current flowing to the semiconductor light emitting element 4 to be a constant value based on the reference voltage Vref1 even when a power source voltage and an ambient temperature have changed, and can accordingly reduce input current distortion.

Since the control circuit can be configured by using a commercially available IC for power factor improvement, it can be produced at relatively low cost. Among the commercially available ICs for power factor improvement are low-cost ICs which include an error amplifier EA, a multiplier circuit 52, a comparator CP1, a flip-flop FF1, and a driving circuit 54 in one chip. However, as previously noted, the semiconductor light-emitting element 4 is dimmed by setting the reference voltage Vref1 to be adjustable, and dimming control is substantially more difficult where the reference voltage Vref1 is incorporated in the IC.

Another conventional dimming method includes converting an externally-provided PWM signal into a second PWM signal having a different pulse width, interrupting current flowing to a semiconductor light-emitting element in accordance with the converted PWM signal, and adjusting the amplitude of the current flowing to the semiconductor light-emitting element in accordance with a direct-current voltage obtained by smoothing the PWM signal. In such techniques, the on-resistance of the transistor is variably controlled to adjust the amplitude of the current flowing to the semiconductor light-emitting element, and thus a large loss of electric power is generally incurred. To reduce power loss, the amplitude of the current flowing to the semiconductor light-emitting element is adjusted by using a switching power source circuit such as a chopper circuit, which has high power conversion efficiency when operating in a critical mode where the switching element is controlled to be turned on after detecting a zero-cross point for the regeneration current.

An exemplary configuration for controlling the current flowing to the semiconductor light-emitting element to be constant with use of a step-down chopper circuit operating in the critical mode includes PWM-controlling a drive signal of a switching element of the step-down chopper circuit on the basis of a dimming signal.

However, when the duty cycle (on-pulse width) of the switching element is controlled by the PWM, the zero-crossing time for the regeneration current, and thus the switching frequency, may vary in a wide range when control of the duty cycle is arbitrarily variable on the basis of the dimming signal in the switching power source circuit operating in the critical mode, as shown for example by the dashed line in FIG. 15(e)). Also, even if the high frequency switching operation is intermittently stopped on the basis of a low-frequency PWM signal, dimming cannot be sufficiently realized only within the range where the PWM signal can be varied, and accordingly the dimming range is limited.

Referring now to FIG. 19, a conventional operating method for an LED lighting device is represented wherein current flowing to a semiconductor light-emitting element (or LED module) is controlled via a step-down chopper circuit operating in a so-called critical mode. Energy stored in an inductor during an on-period $T_{ON}$ of the switching element is discharged during an off-period $T_{OFF}$, the switch is turned on again when the energy discharge is completed, and thus the power conversion efficiency becomes greater in comparison with other control modes. In addition, since substantially half the peak value of the switching current is an effective value of a load current, constant current control can be easily realized.

An example of the critical mode operation may be further described with reference to a switching element Q1 of a step-down chopper circuit 3a as shown in FIG. 5(a). A DC voltage is supplied across input terminals A and B, having conventionally been obtained by stepping-up a commercially-available alternating-current (AC) power source. An LED series circuit or a load circuit is coupled across output terminals C and D. When the switching element Q1 is turned on, current IQ1 (referring again to FIG. 19) flows via a switching element Q1, an inductor L1, and a capacitor C2, and thus energy is stored in the inductor L1. When the switching element Q1 is turned off, a counter-electromotive force is generated due to the energy stored in the inductor L1, and thus a regeneration current ID1 flows from the inductor L1 to the capacitor C2 and then to a diode D1. When the switching element Q1 is turned on again (upon the regeneration current ID1 returning to zero), switching loss is relatively small and accordingly the power conversion efficiency becomes higher in comparison with other control modes.

It would be desirable to provide a circuit configuration for PWM control of the on-period $T_{ON}$ of the switching element Q1 based on an external dimming signal, and which could be implemented prior to factory shipment via easy and low-cost output adjustments to variations in LED characteristic variations or circuit constants such as inductance, temperature variations, age deterioration, etc.

BRIEF SUMMARY OF THE INVENTION

A lighting device is provided with associated circuitry for controlling a switching element during normal operation to be turned off when current flowing to an inductor reaches a predetermined value, and for controlling the switching element to be turned on when the current discharged via a regeneration diode from the inductance component to a semiconductor light emitting element becomes zero. The control circuitry can intermittently interrupt normal operation in accordance with a duty ratio of High and Low levels of an input dimming signal as provided from an external source. Various embodiments of the lighting device of the present invention may thereby be effective to power and dim semiconductor light emitting elements with high accuracy in a relatively simple configuration.

In an example where an LED is powered and dimmed through the use of a switching power source circuit operating in a critical mode, a lighting device of the present invention may realize the dimming in a broad range, restricting a variable range of the switching frequency to within a predetermined range.

A particular embodiment of a lighting device in accordance with the present invention is provided for lighting control of an LED module based on an externally provided dimming control signal. A chopper circuit includes a switch coupled across a DC input and an inductor which receives and stores energy when the switch is turned on, and discharges energy to the LED module when the switch is turned off. A control circuit determines a current value to the switch, and compares the current value to a predetermined value. During normal operation, the switch is turned off when the detected current value reaches the predetermined value and turned back on when inductor discharge has completed. During a dimming operation, the normal operation is intermittently disabled in accordance with the dimming control signal.

In an aspect of the present invention, the dimming control signal may be a low-frequency PWM signal, with the lighting output being dimmed as a result of the duty ratio of the PWM signal.

In various embodiments, the control circuit may in the dimming operation intermittently disable the normal operation by, for example, adjusting the predetermined value in accordance with the dimming control signal, or by shorting a control electrode of the switching element to circuit ground in accordance with the dimming control signal.

In another aspect, an LED lighting device of the present invention is provided for a video camera having a shutter speed. The control circuit receives a PWM dimming control signal having a frequency set to an integral multiple of an inverse of shutter speed of the video camera, and intermittently disables the normal operation in accordance with the dimming control signal.

The control circuit may further receive a synchronization signal associated with an exposure period for the video camera, and disable the normal and dimming operations based on the synchronization signal, wherein the PWM signal is switched in synchronization with the electric shutter of the video camera and energy is provided to the output connector only during the exposure period in synchronization with a timing of the electronic shutter of the video camera.

BRIEF DESCRIPTION OF THE SEVERAL VIEWS OF THE DRAWINGS

FIGS. 16(a) to 16(c) are circuit diagrams representing exemplary configurations for circuitry in the lighting device of FIG. 14.

DETAILED DESCRIPTION OF THE INVENTION

Figure 1:
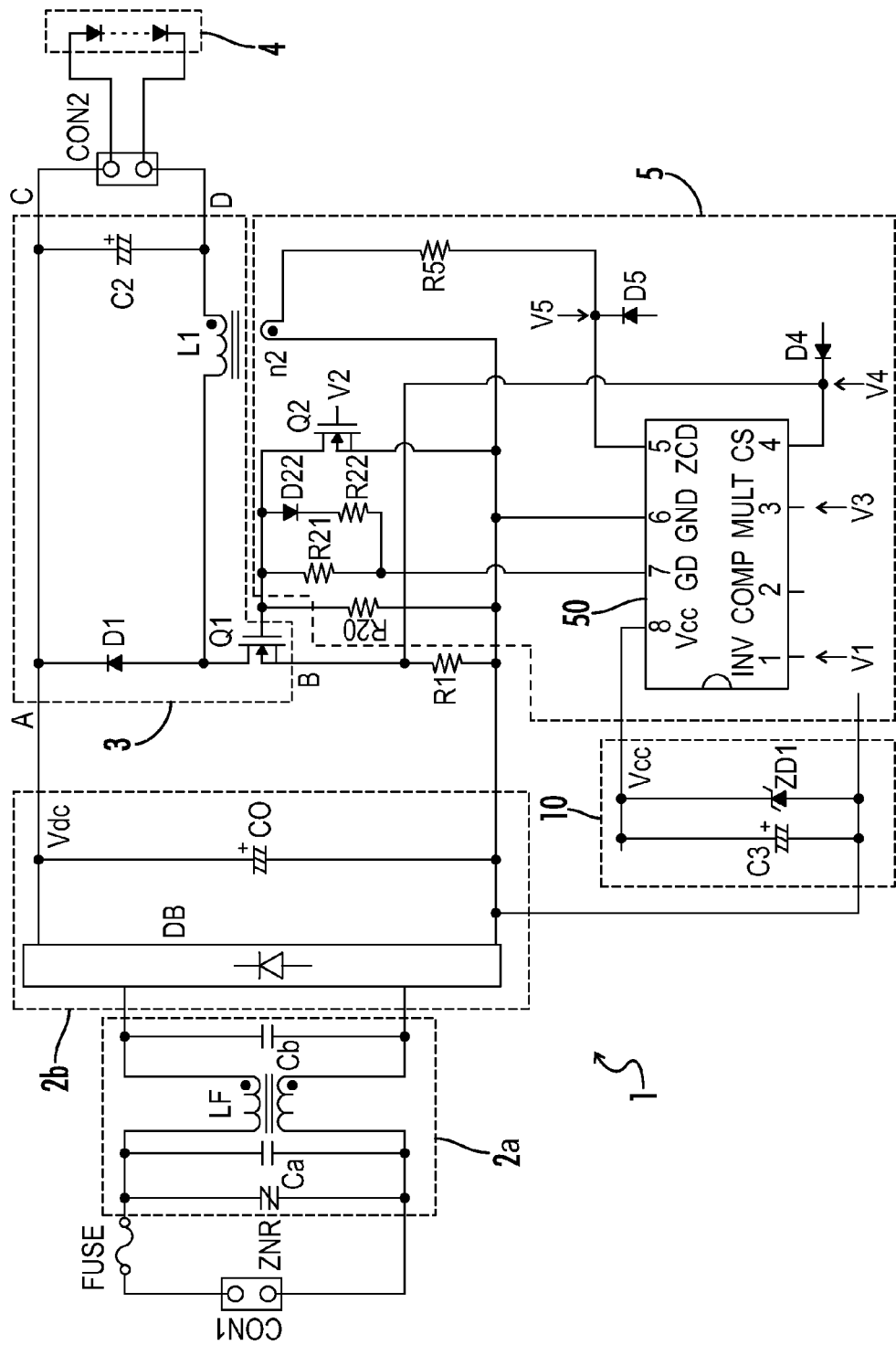
FIG. 1 is a circuit diagram representing a lighting device according to an embodiment of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the coupled items or an indirect connection through one or more passive or active intermediary devices.

The term "circuit" means at least either a single component or a multiplicity of components, either active and/or passive, that are coupled together to provide a desired function.

The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, signal processor, logic or alternative analog or digital electronic device that may be transformative of signals represented as physical quantities, whether automatically or manually initiated.

The terms "controller" or "control circuit" as used herein may unless otherwise stated refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Referring generally to FIGS. 1-19, various embodiments of a lighting device in accordance with the present invention are described herein. Where the various figures may describe embodiments sharing various common elements and features with other embodiments, similar elements and features are given the same reference numerals and redundant description thereof may be omitted below.

Referring first to FIG. 1, in an embodiment a lighting device in accordance with the present invention includes an input terminal CON1 and an output terminal CON2. A commercially-available AC power source (100V, 50/60 Hz) may be coupled to the input terminal CON1, and a semiconductor light emitting element 4 coupled to the output terminal CON2. The semiconductor light emitting element 4 may be for example an LED module including a single light-emitting diode (LED) or otherwise configured by coupling a plurality of LEDs in series, in parallel, or in series and parallel.

A DC power source circuit 2b may be coupled to the input terminal CON1 via a current fuse FUSE and a filter circuit 2a, an example of which as shown includes a surge voltage absorbing element ZNR, filter capacitors Ca and Cb, and a common mode choke coil LF. Although the DC power source 2b in an embodiment as represented in FIG. 1 is a rectifier circuit including a full-wave rectifier DB and a smoothing capacitor C0, the DC power source 2b may alternatively be formed by a power factor correction (PFC) circuit using a step-up chopper configuration.

A step-down chopper circuit 3 is coupled to an output terminal of the DC power source circuit 2b. The step-down chopper circuit 3 includes an inductor L1 coupled on a first end to, and in series with, the semiconductor light emitting element 4, a switching element Q1 coupled to a second end of, and in series with, the inductor L1, and a regeneration diode D1 coupled in parallel to the series circuit of the inductor L1 and the semiconductor light emitting element 4 and coupled in a direction to emit energy stored in the inductor L1 to the semiconductor light emitting element 4 when the switching element Q1 is turned off. In addition, an output capacitor C2 is coupled in parallel with the semiconductor light emitting element 4. The capacitance of the output capacitor C2 is set so that pulsating components caused by the turning on and off of the switching element Q1 can be smoothed and so that the smoothed DC current can flow to the semiconductor light emitting element 4.

The switching element Q1 is driven at a high-frequency wave to be turned on and off by a control circuit 5. The control circuit 5 includes a controller integrated circuit (IC) 50 and peripheral circuitry. As the controller IC 50, an L6562 chip manufactured by the ST Microelectronics Corporation is employed in the embodiment shown. The particular chip (L6562) is primarily a controller IC for PFC circuits, and internally includes extra components not used for the control of the step-down chopper circuit, such as for example a multiplier circuit. On the other hand, control operations to make an average value of the input current to be similar in shape with an envelope line of the input voltage, a function to control a peak value of the input current and a zero-cross control function are included in a single chip, and these functions are diverted to the control of the step-down chopper circuit.

Figure 2:
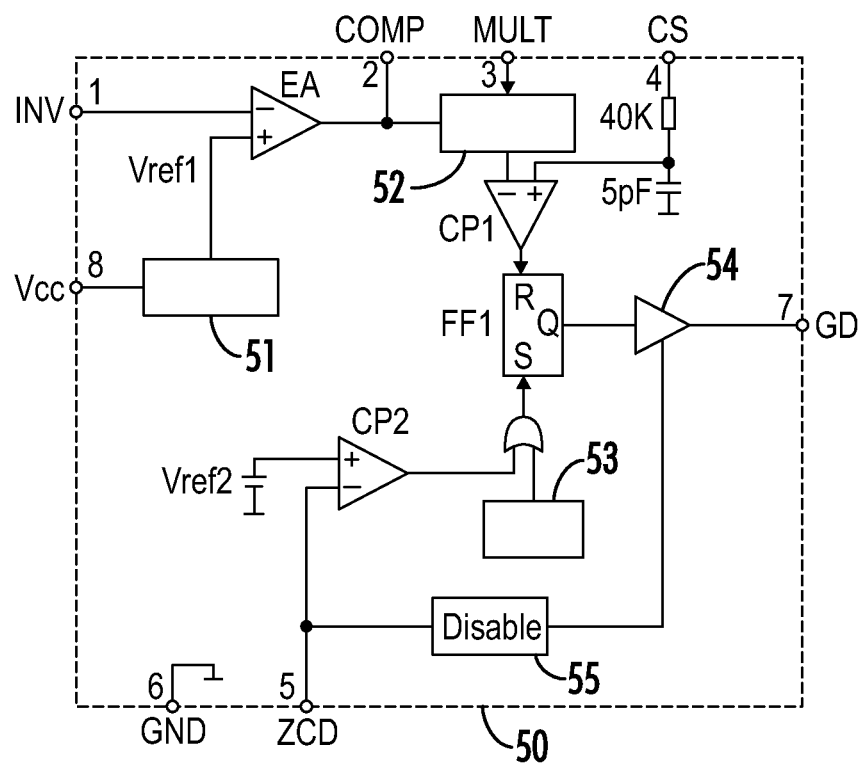
FIG. 2 is a circuit diagram representing a conventionally known controller IC as may be used for the lighting device of FIG. 1.

A simplified internal configuration of the controller IC 50 used in the lighting device of FIG. 1 is further represented in FIG. 2. A first pin (INV) is an inverted input terminal of a built-in error amplifier EA, a second pin (COMP) is an output terminal of the error amplifier EA, a third pin (MULT) is an input terminal of the multiplier circuit 52, a fourth pin (CS) is a chopper current detection terminal, a fifth pin (ZCD) is a zero-cross detection terminal, a sixth pin (GND) is a ground pin, a seventh pin (GD) is a gate drive terminal, and an eighth pin (Vcc) is a power source terminal.

When a controller power source voltage equal to or greater than a predetermined voltage is supplied between a power source terminal Vcc and a ground terminal GND, reference voltages Vref1 and Vref2 are generated by the controller power source 51, and each internal circuit of the integrated circuit becomes ready to operate. Upon supplying the power source, a start pulse is provided to a set input terminal S of a flip-flop FF1 by a starter circuit 53, and thereby a Q output of the flip-flop FF1 is forced High. In this manner, the seventh pin (a gate drive terminal GD) is forced High via the driving circuit 54.

When the seventh pin (the gate drive terminal GD) is at a High level, a gate drive voltage divided by resistances R21 and R20 (referring to FIG. 1) is applied between the gate and source of the switching element Q1. The resistance R1 is a small resistance used for current detection, and accordingly does little to influence the drive voltage between the gate and source.

When the switching element Q1 is turned on, the current flows from a positive terminal of the capacitor C0 to a negative terminal of the capacitor C0 via the output capacitor C2, the inductor L1, the switching element Q1, and the resistor R1. Unless the inductor L1 is magnetically saturated, a chopper current i flowing to the inductor L1 rises in substantially linear fashion. The current is detected by the resistor R1, and is input to the fourth pin (CS) of the controller IC 50.

The fourth pin (CS) of the controller IC is a chopper current detection terminal, and the voltage is applied to a plus (+) input terminal of the comparator CP1 via noise filters of 40 KΩ and 5 pF in the IC. A reference voltage is applied to a minus (−) input terminal of the comparator CP1. The reference voltage is determined by an input voltage V1 of the first pin (INV) and an input voltage V3 of the third pin (MULT).

When the voltage of the chopper current detection terminal CS exceeds the reference voltage, the output of the comparator CP1 is forced High, and then a reset signal is input to a reset input terminal R of the flip-flop FF1. In this manner, the Q output of the flip-flop FF1 is forced Low. Since the driving circuit 54 operates so as to attract the current from the seventh pin (the gate drive terminal GD), a diode D22 (see FIG. 1) is turned on, an electric charge between the gate and source of the switching element Q1 is drawn via the resistance R22, and thus the switching element Q1 is rapidly turned off.

When the switching element Q1 is turned off, the electromagnetic energy stored in the inductor L1 is discharged to the output capacitor C2 via the regeneration diode D1. Since a voltage across the inductor L1 is clamped by the voltage Vc2 of the output capacitor C2, the current i of the inductor L1 is decreased along a substantially-constant slope (di/dt≈−Vc2/L1).

When the voltage Vc2 of the capacitor C2 is high, the current i of the inductor L1 rapidly attenuates, and when the voltage Vc2 of the capacitor C2 is low, the current i of the inductor L1 slowly attenuates. Accordingly, even when a peak value of a current flowing to the inductor L1 is constant, the amount of time until the inductor current disappears will change. The higher the voltage Vc2 of the capacitor C2, the shorter the required time, and vice-versa.

During a period when the current i flows to the inductor L1, the voltage in a secondary winding n2 of the inductor L1 corresponds to the slope of the current i of the inductor L1. When the inductor current no longer flows, the voltage disappears. The timing of this condition is detected by the fifth pin (the zero-cross detection terminal ZCD).

A minus (−) input terminal of the comparator CP2 for the zero-cross detection is coupled to the fifth pin (the zero-cross detection terminal ZCD) of the controller IC. The reference voltage Vref2 for the zero-cross detection is coupled to a plus (+) input terminal of the comparator CP2. When the voltage of the secondary winding n2 applied to the fifth pin (the zero-cross detection terminal ZCD) disappears, the output of the comparator CP2 goes High, a set pulse is provided to the set input terminal S of the flip-flop FF1 via an OR gate, and then the Q output of the flip-flop FF1 is forced High. Thus, the seventh pin (the gate drive terminal GD) is forced High via the driving circuit 54.

In this manner a DC voltage that is stepped down from the output voltage of the capacitor C0 is provided to the output capacitor C2, and thereby further supplied via the output connector CON2 to the semiconductor light emitting element 4. In the case where a light emitting diode (LED) or LED module is used as the semiconductor light emitting element 4, when a forward voltage of the LED is Vf and the number of series connections is n, the voltage Vc2 of the output capacitor C2 is clamped approximately at n×Vf.

Accordingly, regardless of the number n of series connections of the LEDs, a lighting device so configured is able to maintain a constant current characteristic. When the number n of LED's connected in series is large, the voltage Vc2 of the output capacitor C2 is high, and accordingly a voltage difference with respect to the voltage Vdc of the capacitor C0 (Vdc−Vc2) becomes small. The voltage separately applied to the inductor L1 when the switching element Q1 is turned on also becomes small, which makes the rise time di/dt=(Vdc−Vc2)/L1 of the current i flowing to the inductor L1 relatively slow. The current i flowing to the inductor L1 will take a relatively long time to reach a predetermined peak value as a result, and accordingly the on-time of the switching element Q1 will also be long.

During the time period that the switching element Q1 is turned off, a counter electromotive force generated across the inductor L1 is clamped at the voltage Vc2 (=n×Vf) of the capacitor C2. Accordingly, when the number n of series connections of the LEDs is large, the voltage applied to the inductor L1 when the switching element Q1 is turned off becomes large, and an attenuating speed di/dt=−Vc2/L1 of the current i flowing to the inductor L1 becomes fast. As a result, the time until the current i flowing to the inductor L1 becomes zero will be short, and accordingly the off-time of the switching element Q1 will be short.

Conversely, it may be understood that when the number n of series connection of the LEDs is relatively small, the on-time of the switching element Q1 is shorter and the off-time is longer. In such a state, the voltage Vc2 of the output capacitor C2 is low, and accordingly a voltage difference (Vdc−Vc2) with respect to the voltage Vdc of the capacitor C0 becomes large. The voltage separately loaded to the inductor L1 when the switching element Q1 is turned on becomes large, and thus the rise time di/dt=(Vdc−Vc2)/L1 of the current i flowing to the inductor L1 becomes fast. As a result, the time until the current i flowing to the inductor L1 reaches a predetermined peak value will be short, and accordingly the on-time of the switching element Q1 will be short.

During the time the switching element Q1 is turned off, the counter electromotive force generated across the inductor L1 is clamped at the voltage Vc2 (=n×Vf) of the capacitor C2. Accordingly, when the number n of series connections of the LEDs is small, the voltage applied to the inductor L1 when the switching element Q1 is turned off becomes small, and thus the attenuating speed di/dt=−Vc2/L1 of the current i flowing to the inductor L1 becomes slow. As a result, the time period until the current i flowing to the inductor L1 becomes zero will be long, and accordingly the off-time of the switching element Q1 will be long.

As described above, when the number n of series connections of the LEDs is large, the on-time of the switching element Q1 automatically becomes long and the off-time automatically becomes short, and when the number n of series connections of the LEDs is small, the on-time of the switching element Q1 automatically becomes short and the off-time automatically becomes long. Accordingly, regardless of the number n of series connections of the LEDs, a lighting device so configured is able to maintain a constant current characteristic.

In an embodiment as shown a controller power source circuit 10 includes a smoothing capacitor C3 and a zener diode ZD1 for regulating the voltage, but the controller power source 10 is not so limited and alternative configurations may be used within the scope of the present invention. For example, a configuration may be employed to supply a charging current via a high resistance from a positive electrode of the capacitor C0 to a positive electrode of the capacitor C3 may be employed. An alternative configuration may be used so as to constantly charge the capacitor C3 from the secondary winding n2 of the inductor L1.

The timing when the current flowing to the inductor L1 becomes substantially zero may generally be detected by detecting the timing of the voltage disappearance from the secondary winding n2 of the inductor L1. However, a circuit able to detect the timing of disappearance of the regeneration current may be employed, for example, to detect the rising of a counter-directional voltage of the regeneration diode D1 and detect the stepping down of the voltage across the switching element Q1.

With a lighting device of the embodiment represented in FIG. 1, the average value of the chopper current is substantially independent of the load. Accordingly, regardless of the load, an effective value of the output current supplied to the load by smoothing the pulsating components of the chopper current through the use of the output capacitor C2 may be substantially zero.

Dimming operation may now be described for the output current supplied to the semiconductor light emitting element 4, which generally stated involves intermittently stopping the high-frequency chopper operation on the basis of a low-frequency PWM signal (as a dimming control signal provided externally with respect to the lighting device as further described below).

Referring still to the embodiment of FIG. 1, a switching element Q2 is coupled between the control electrode (gate) of the switching element Q1 and the circuit ground (i.e., negative output terminal for the DC power source 2b), and thus as one example the gate voltage V2 of the switching element Q2 is controlled on the basis of the low-frequency PWM signal to perform the dimming operation. Alternatively or in addition, one or more of the input voltage V1 of the first pin (INV) of the controller IC, the input voltage V3 of the third pin (MULT), the input voltage V4 of the fourth pin (CS), and the input voltage V5 of the fifth pin (ZCD) may be controlled on the basis of the low-frequency PWM signal.

Exemplary details for the respective dimming control means will be separately explained below.

Figure 3:
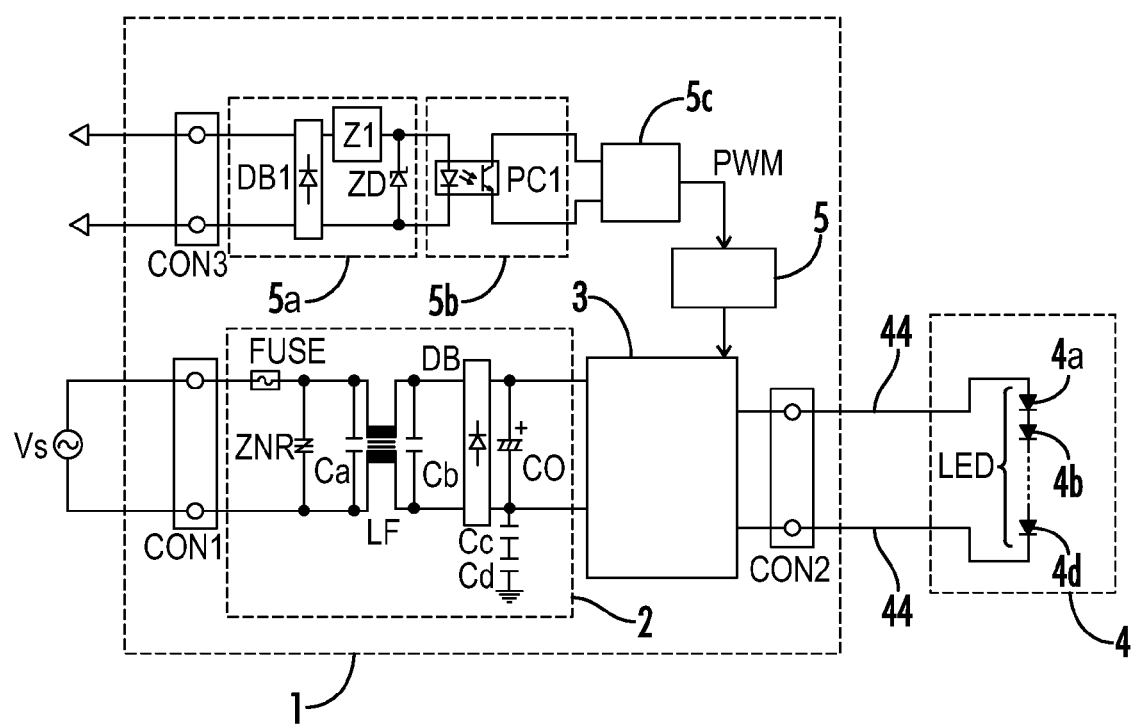
FIG. 3 is a circuit block diagram showing an embodiment of an LED dimming circuit using the lighting device of FIG. 1.

The low-frequency PWM dimming signal may be a rectangular wave voltage signal of, for example, 1 kHz. The longer a Low level period is in one cycle, the larger the dimming output becomes. This type of PWM signal is widely used for dimming of fluorescent lights, and as represented in FIG. 3 may be externally supplied from a dimming signal line via the connector CON3 of the lighting device 1 and input to the control circuit 5 via a rectifier circuit 5a, an isolation circuit 5b, and a waveform shaping circuit 5c.

Where the gate voltage V2 of the switching element Q2 is controlled to be turned on and off on the basis of the low-frequency PWM dimming signal, when the gate voltage V2 is High, the switching element Q2 is turned on to short the control electrode of the switching element Q1 to ground. In addition, when the gate voltage V2 is Low, the switching element Q2 is turned off to be in the same high impedance state as a non-coupled state.

When the switching element Q2 is turned on, a node between the resistor R21 and the switching element Q2 is forced Low. Accordingly, even when the seventh pin (the gate drive terminal GD) of the controller IC continues to be switched High/Low by the high-frequency wave, the gate drive output is consumed by the resistance R21, and thereby the switching element Q1 is maintained in the off-state. Operation of the IC may also be disabled by shorting the fifth pin of the controller IC to ground, but in either event the chopper operation will be disabled.

Alternatively, when switching element Q2 is turned off (e.g., in response to a Low PWM signal), since the switching element Q1 may now be switched on/off in accordance with the high-frequency wave at the seventh pin (the gate drive terminal GD) of the controller IC, the chopper operation returns to a normal state.

Hence, a ratio between a normal chopper operation time period and a disabled chopper operation time period coincides with a ratio between a Low level period and a High level period of the PWM signal. A constant current is supplied in the normal chopper operation time period and current supply is stopped in the disabled chopper operation time period, and consequently current depending on a ratio of the Low level period to one cycle of the PWM signal is supplied to the semiconductor light emitting element 4. In this manner, dimming with high precision can be realized.

An example of a case where the input voltage V1 of the first pin (INV) of the controller IC is controlled on the basis of the low-frequency PWM signal may be explained. The higher the input voltage V1 of the first pin (INV) becomes, the lower the peak value of the current flowing to the switching element Q1 is controlled to be. Then, for example, when the low-frequency PWM signal is High, the input voltage V1 of the first pin (INV) is set to be high, and when the low-frequency PWM signal is Low, the input voltage V1 of the first pin (INV) is set to be low. In the period when the input voltage V1 is high, the peak value of the current flowing to the switching element Q1 is controlled to be low, and in the period when the input voltage V1 is low, the peak value of the current flowing to the switching element Q1 is controlled to be high. Accordingly the dimming process can be carried out by changing the ratio of the respective periods.

An example where the input voltage V3 of the third pin (MULT) of the controller IC is controlled on the basis of the low-frequency PWM signal will be explained. The higher the input voltage V3 of the third pin (MULT) becomes, the higher the peak value of the current flowing to the switching element Q1 is controlled to be. Then, for example, when the low-frequency PWM signal is High, the input voltage V3 of the third pin (MULT) is set to be low, and when the low-frequency PWM signal is Low, the input voltage V3 of the third pin (MULT) is set to be high. In the period when the input voltage V3 is high, the peak value of the current flowing to the switching element Q1 is controlled to be high, and in the period when the input voltage V3 is low, the peak value of the current flowing to the switching element Q1 is controlled to be low. Accordingly the dimming process can be carried out by changing the ratio of the respective periods.

An example where the input voltage V4 of the fourth pin (CS) of the controller IC is controlled on the basis of the low-frequency PWM signal will now be explained. As described above, when the input voltage V4 of the fourth pin (CS) becomes higher than the internal reference voltage (the input voltage of the minus (−) input terminal of the comparator CP1), the switching element Q1 is controlled to be turned off. Then, for example, when the low-frequency PWM signal is High, the input voltage V4 of the fourth pin (CS) is controlled so as to rapidly reach the reference voltage. More particularly, the detection voltage of the fourth pin (CS) is increased in a quasi method to superpose a DC current on the resistance R1 via the diode D4, and thereby the input voltage V4 of the fourth pin (CS) is controlled so as to rapidly reach the reference voltage. In this case, the peak value of the current flowing to the switching element Q1 becomes lower than the normal value. In addition, when the low-frequency PWM signal is Low, normal operation is returned by removing the superimposed current flowing via the diode D4. Accordingly, when the low-frequency PWM signal is High, the peak value of the current flowing to the switching element Q1 becomes lower than the normal value, and when the low-frequency PWM signal is Low, the peak value of the current flowing to the switching element Q1 returns to the normal value. In this manner, the dimming can be carried out on the basis of a ratio between a Low level period and a High level period of the low-frequency PWM signal.

In an embodiment, when the low-frequency PWM signal is High, the input voltage V4 of the fourth pin (CS) may be controlled so as to be constantly higher than the reference voltage (the input voltage of the minus (−) input terminal of the comparator CP1). In this case, the on-time of the switching element Q1 becomes approximately zero, and the chopper operation is substantially disabled.

Next, an example of a case where the input voltage V5 of the fifth pin (ZCD) of the controller IC is controlled on the basis of the low-frequency PWM signal may be explained. As described above, when the input voltage V5 of the fifth pin (ZCD) rises negatively (i.e., increases in a negative direction), the switching element Q1 is controlled to be turned on again. When the low-frequency PWM signal is High, the input voltage V5 of the fifth pin (ZCD) is controlled so as not to negatively rise by superposing a DC voltage via the diode D5. In addition, when the low-frequency PWM signal is Low, the operation is returned to normal by removing the superimposed voltage. Accordingly, when the low-frequency PWM signal is High, the switching element Q1 is not turned on, and when the low-frequency PWM signal is Low, the switching element Q1 is controlled to be turned on/off. In this manner, the dimming process can be carried out on the basis of the duty ratio between the Low level period and the High level period of the low-frequency PWM signal.

In another example, operation of the IC may be controlled to be stopped by shorting the fifth pin (ZCD) of the controller IC to ground in synchronization with the PWM signal. As described above, in the case where the L6562 chip manufactured by the ST Microelectronics Corporation is employed as the controller IC (see FIG. 2), a disable circuit 55 is coupled to the fifth pin (ZCD) as the zero-cross detection terminal, and accordingly when the fifth pin is shorted to the ground the IC can be disabled. Accordingly, when the low-frequency PWM signal is High, the fifth pin (ZCD) is shorted to ground to disable the IC, and when the low-frequency PWM signal is Low, the fifth pin (ZCD) is opened to enable normal operation. Dimming can thus be carried out based on the duty ratio between the Low- and High-level periods of the low-frequency PWM signal.

An exemplary overall configuration of an LED dimming circuit 1 incorporating the lighting device of FIG. 1 is represented in FIG. 3. A power source circuit 2 is configured by including the above-mentioned filter circuit 2a and the DC power source 2b. The capacitors Cc and Cb are used for connecting a circuit ground (a negative electrode of the capacitor C0) to a fixture chassis in a high-frequency manner. CON1 is an input terminal coupled to a commercially-available AC power source Vs, CON2 is an output connector coupled to the semiconductor light emitting element 4 via a lead line 44, and CON3 is a dimming connector coupled to a dimming input signal line. To the dimming input signal line, a dimming signal including a duty-variable rectangular wave voltage signal having for example 1 kHz-frequency and 10V-amplitude may be supplied.

The rectifier circuit 5a coupled to the connector CON3 is a non-polarization circuit for the dimming input signal line, and is configured to operate normally even if the dimming signal line is inversely coupled. That is, the input dimming signal is full-wave rectified by full-wave rectifier DB1, and thereby the rectangular wave voltage signal is obtained across zener diode ZD via an impedance element Z1 such as a resistor. The isolation circuit 5b has a photo coupler PC1, and transfers the rectangular wave voltage signal while maintaining isolation of the dimming input signal line and the lighting device. The waveform shaping circuit 5c is a circuit for shaping an output signal waveform from the photo coupler PC1 of the insulating circuit 5b and providing the signal as clearly distinguishable PWM signals whether in a High or Low level. The waveform shaping circuit 5c may be particularly beneficial where the rectangular wave voltage signal is transferred a long distance via the dimming signal line and thereby has a distorted waveform.

In a conventional inverter-type fluorescent lamp dimming lighting device, a low-pass filter circuit such as a CR integration circuit (a smoothing circuit) is provided after the waveform shaping circuit 5c to generate an analog dimming voltage, and an inverter frequency and the like are variably controlled on the basis of the dimming voltage. However, in an embodiment as shown the PWM signal after the waveform shaping is input directly to the control circuit 5 (refer to FIG. 5). In the control circuit 5, when the PWM signal is High operation of the step-down chopper circuit 3 is disabled, and when the PWM signal is Low the chopper operation is allowed. Thereby a magnitude of the DC electricity that is smoothed by the output capacitor C2 of the step-down chopper circuit 3 and is supplied to the semiconductor light emitting element 4 is adjusted. That is, the control circuit 5 and the step-down chopper circuit 3 consequently serve as a low-pass filter circuit for smoothing the PWM signal.

Meanwhile, when the dimming signal line is broken or when the terminal CON3 is otherwise decoupled, the PWM signal is constantly Low. However, since the chopper operation of the step-down chopper circuit 3 is constantly enabled in such a case, the semiconductor light emitting element 4 will be in a fully lit state.

Figure 4:
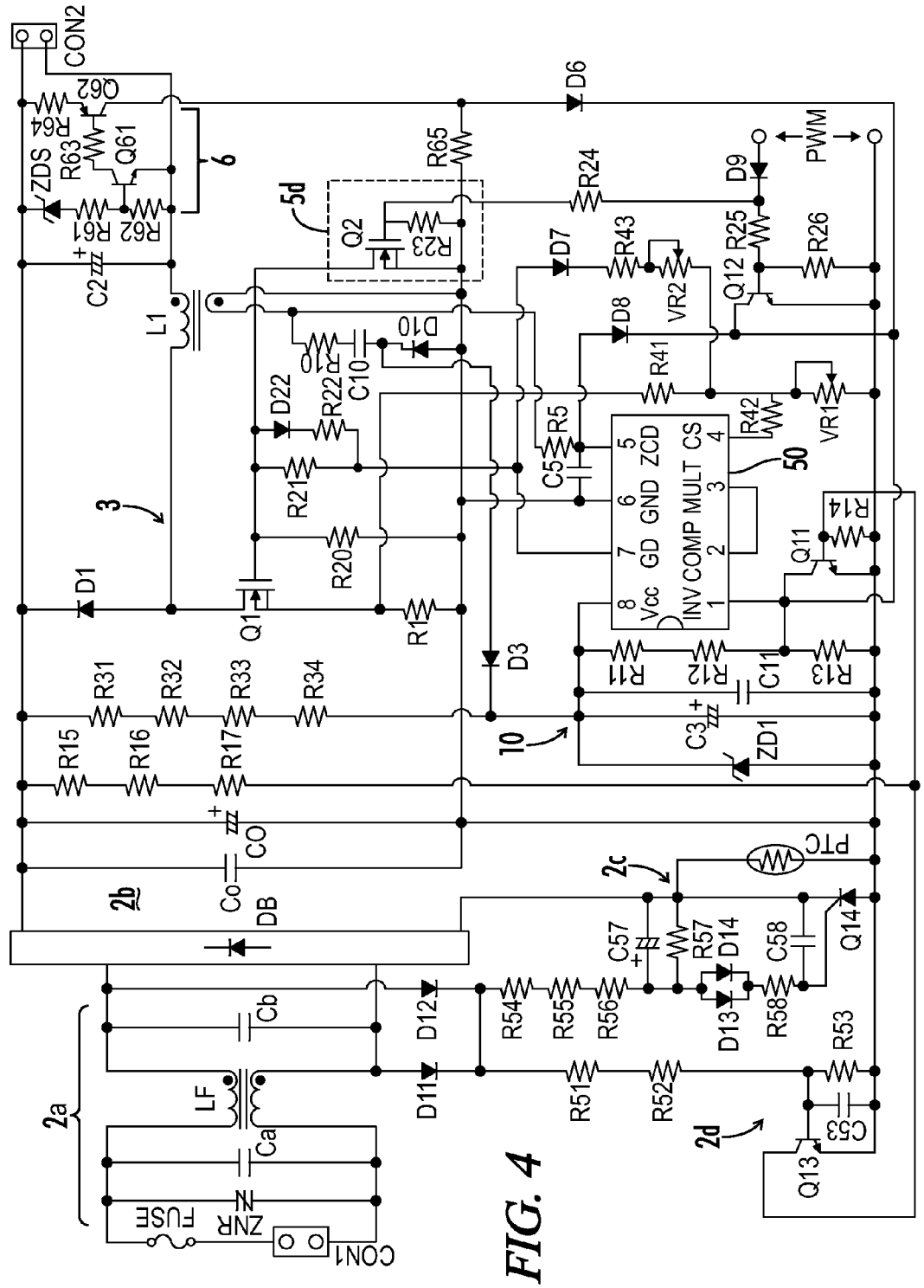
FIG. 4 is a circuit diagram representing another exemplary embodiment of the lighting device of FIG. 1.

Referring now to FIG. 4, in a modified example of the lighting device as previously described, the control is carried out so that when the PWM signal is High, the gate voltage V2 of the switching element Q2 is High and additionally the input voltage V1 of the first pin and the input voltage V5 of the fifth pin both are Low (i.e., shorted to circuit ground).

As described above, in the case where the L6562 manufactured by the ST Microelectronics Corporation is employed as the controller IC, the disable circuit 55 is coupled to the fifth pin (ZCD) serving as the zero-cross detection terminal as shown in FIG. 2, and when the fifth pin is shorted to the ground, the operation of the IC can be stopped. As before, the switching element Q1 can be maintained in the off-state only by turning on the switching element Q2. However, a consumed current can be reduced by disabling the IC.

An AC input terminal of the full-wave rectifier DB is coupled via the filter circuit 2a and the current fuse FUSE to the input terminal CON1. A DC output terminal of the full-wave rectifier DB is coupled via a positive characteristic thermistor PTC to the smoothing capacitor C0. The positive characteristic thermistor PTC is a thermistor whose resistance value becomes higher when a temperature is raised. The smoothing capacitor C0 may have a capacitance of approximately tens of pF. The capacitor Co coupled in parallel to the smoothing capacitor C0 may have a relatively small capacitance for high-frequency bypass.

Immediately after the power source is turned on, the DC output terminal of the full-wave rectifier DB is shorted by the uncharged smoothing capacitor C0, and thus an inrush current flows. The positive characteristic thermistor PTC restricts the inrush current. After the smoothing capacitor C0 is charged, the current restriction due to the positive characteristic thermistor PTC is not required. In addition, wasted power consumption is generated.

Then, a reverse blocking triode thyristor (SCR) Q14 is coupled in parallel with the positive characteristic thermistor PTC, and the thyristor Q14 is controlled to be turned on by the time the charging of the smoothing capacitor C0 is completed after the power source is turned on.

In order to generate a gate voltage for the thyristor Q14, anodes of each of diodes D11 and D12 are coupled to each of the AC input terminals of the full-wave rectifier DB, respectively, and cathodes of the diodes D11 and D12 are coupled to a negative electrode of the DC output terminal of the full-wave rectifier DB via a series circuit of resistors R54, R55, R56, and R57. An electrolytic capacitor C57 is coupled in parallel to resistor R57 and acts as a timer by regulating a delay time until the thyristor Q14 is turned on after the power source is turned on. When a voltage of the electrolytic capacitor C57 rises, the gate voltage is supplied to the thyristor Q14 via a parallel circuit of the diodes D13 and D14 and via resistor R58. Meanwhile, a capacitor C58 coupled in parallel between the gate and cathode of the thyristor Q14 may prevent false operation.

The above-mentioned circuit including resistors R54 to R58, capacitors C57 and C58, diodes D11 to D14, thyristor Q14, and positive characteristic thermistor PTC may herein define an inrush current prevention circuit 2c.

Diodes D11 and D12 of the inrush current prevention circuit 2c may also be used as a rectifier of a power discontinuity detection circuit 2d. The power discontinuity detection circuit 2d in an example as shown includes a resistive series circuit R51, R52, and R53, a capacitor C53 coupled in parallel to resistor R53, and a transistor Q13 to which a forward bias is applied due to a voltage of capacitor C53. The resistive series circuit R51 to R53 is preliminarily coupled between the cathodes of diodes D11 and D12, and a negative electrode of the smoothing capacitor C0. When the AC power source is applied, an current flows to the resistive series circuit R51 to R53, the capacitor C53 is charged, and then the transistor Q13 is turned on. When the AC is blocked, the current via the resistive series circuit R51 to R53 is immediately blocked. Then, an electric charge on the capacitor C53 is discharged via resistor R53, the forward bias of the transistor Q13 disappears, and accordingly the transistor Q13 is turned off.

Meanwhile, the capacitance of capacitor C53 is set so that turning off of the transistor Q13 can be delayed until a power-blocking state has continued for a few cycles of the AC power source. In cases where the AC power source is momentarily interrupted, where phase control is carried out, or near the zero-crossing of the AC power source, the transistor Q13 is not turned off.

On the other hand, even when the AC power source is blocked, the current flowing from the smoothing capacitor C0 via the resistive series circuit R15 to R17 is not blocked while a charge remains on the smoothing capacitor C0. In accordance with an embodiment as shown, a forward bias is applied to a transistor Q11 by the current supplied to resistor R14 via the resistive series circuit R15 to R17 when the transistor Q13 of the power discontinuity detection circuit 2d is turned off, and then the first pin (INV) of the controller IC is shorted to ground. On this occasion, the fifth pin (ZCD) is also shorted to ground via diode D8. In this manner, a lighting output blink upon power discontinuity may be substantially prevented.

The voltage of smoothing capacitor C0 becomes a voltage near the peak value (approximately 140V) of the commercially-available AC power source voltage (100V, 50/60 Hz). A charging current is supplied from smoothing capacitor C0 to capacitor C3 for supplying a controller power source voltage Vcc via resistors R31 to R34 used for the stepping-down process.

When the voltage of capacitor C3 becomes equal or greater than an operable voltage of the controller IC, the on-off operation of the switching element Q1 is started, a high-frequency chopping current flows to the inductor L1, and accordingly a high-frequency rectangular wave voltage is generated in the secondary winding. Current flows via diode D10, capacitor C10, and resistor R10 due to the voltage generated in the secondary winding of the inductor L1 when switching element Q1 is turned on, and thus the capacitor C10 is charged. Since a voltage of reversed polarity is generated in the secondary winding of inductor L1 when switching element Q1 is turned off, a charging current flows to the capacitor C3 via diode D3 and resistor R10 due to the voltage obtained by summing the generated voltage and the charging voltage of the capacitor C10. Accordingly, the voltage of the capacitor C3 tends to increasingly rise. However, since a zener diode ZD1 is coupled in parallel, the constant controller power source voltage Vcc is generated by being clamped with the zener voltage.

Meanwhile, the voltage of the capacitor C3 for supplying the controller power source voltage Vcc is substantially tens of V. The capacitor C11 coupled in parallel with the capacitor C3 has a relatively small capacitance for bypassing the high-frequency components of the charging current flowing via the diode D3.

The controller power source voltage Vcc is divided by the resistances R11, R12, and R13, and is applied to the first pin (INV) of the controller IC. As described above, the voltage is used for regulating the peak value of the current flowing to the switching element Q1.

The second pin (COMP) and third pin (MULT) of the controller IC are shorted in an embodiment as shown. The detected voltage from the current sensor (resistor R1) is input to the fourth pin (CS), via a series circuit of resistors R41 and R42. A variable resistor VR1 for adjusting a current detection sensitivity is preliminarily coupled between a node between resistors R41, R42 and ground. When a resistance value of the variable resistor VR1 is lowered, since the detection voltage of the current sensor R1 is divided by the resistance R41 and the variable resistance VR1 and is input to the fourth pin (CS), the current detection sensitivity can be lowered, and thereby the peak value of the current flowing to the switching element Q1 can be raised.

In addition, a DC voltage is superimposed to the variable resistor VR1 from the seventh pin (GD) to supply the gate drive voltage of the switching element Q1 via a diode D7, a resistor R43, and a variable resistor VR2. When the resistance value of the variable resistor VR2 is lowered, since the superimposed DC voltage is increased, the voltage of the fourth pin (CS) is increased, and accordingly the peak value of the current flowing to the switching element Q1 can be lowered.

The peak value of the current flowing to the switching element Q1 can be appropriately set by adjusting the two variable resistors VR1 and VR2. An exemplary "appropriate" setting may be where an upper limit value is in a range where the inductor L1 is not magnetically saturated and in a range where the upper limit value does not exceed the maximum peak current of the switching element Q1, and the lower limit value is in a range where the operating frequency of the switching element Q1 does not become too high.

A low-pass filter circuit including resistor R5 and capacitor C5 is coupled to the fifth pin (ZCD). In addition, the fifth pin is coupled to the first pin (INV) via diode D8, and when the first pin (INV) is shorted to ground due to the transistor Q11 or Q12, the potential of the fifth pin (ZCD) is also configured to be dropped to the ground potential.

As previously described, the transistor Q11 is turned on when the power discontinuity is detected, and when the PWM signal is High the transistor Q12 coupled in parallel to the transistor Q11 is turned on.

In the embodiment presently described, the PWM signal is a rectangular wave voltage signal of for example 1 kHz, and when the signal is High, the current flows via diode D9 and resistors R24 and R23, a voltage across resistor R23 rises, the gate voltage of the switching element Q2 including the MOSFET exceeds a threshold voltage, and thereby the switching element Q2 is turned on. In addition, the current flows via diode D9 and resistors R25 and R26, a voltage across the resistor R26 rises, and thereby the transistor Q12 is turned on. When the PWM signal is Low both the switching element Q2 and the transistor Q12 are turned off.

A no-load detection circuit 6 includes a zener diode ZD6, resistors R61 to R64, and transistors Q61 and Q62. As shown in FIG. 3, the semiconductor light emitting element 4 is connected to the output terminal CON2 via a lead line 44. The semiconductor light emitting element 4 is configured by including a series circuit of a plurality of LEDs 4a to 4d. When the number of series connections is n and a forward voltage is Vf, the voltage of the output terminal CON2 in a loaded connection is clamped approximately to n×Vf. The zener voltage of the zener diode ZD6 is set to be a little higher than the n×Vf.

If a loose connection is generated in the output connector CON2, for example where the lead line 44 is removed or broken, or any one of the plurality of LEDs is removed or missing, the voltage of the output connector CON2 is not clamped at n×Vf. When on-off operation of the switching element Q1 is continued in that condition the voltage of capacitor C2 will rise, and when the capacitor voltage exceeds the zener voltage of the zener diode ZD6, the current flows via resistors R61 and R62 to turn on the transistor Q61 and the current flows via resistors R63 and R64 to turn off the transistor Q62. In this manner, the current flows via the transistor Q62 and resistor R65, a voltage is generated across resistor R65, and thus the voltage of the first pin (INV) of the controller IC is raised via diode D6. Accordingly, since the current peak value of the switching element Q1 is controlled to be low, the voltage rising of the capacitor C2 is suppressed.

Figure 5A:
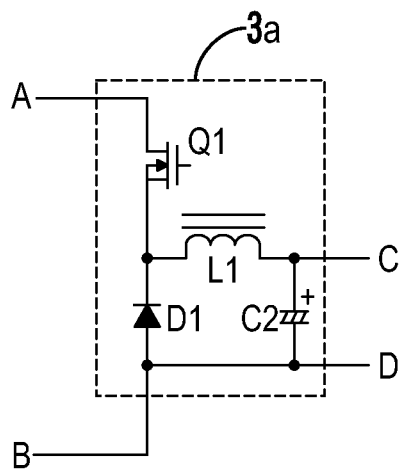
FIGS. 5(a) to 5(d) are circuit diagrams representing various types of conventional switching power source circuits to which a lighting device of the present invention can be applied.

An example where the switching element Q1 of the step-down chopper circuit 3 is arranged on a lower potential side has now been explained. However, as shown in FIG. 5(a), it may be understood that the present invention can be also applied to the case where the switching element Q1 of the step-down chopper circuit 3a is arranged on a higher potential side.

Additionally, an externally-excited control circuit using the controller IC as shown FIG. 2 was exemplified. However, the present invention is not so limited and can be also applied to an LED lighting device using a self-exciting control circuit.

Figure 7:
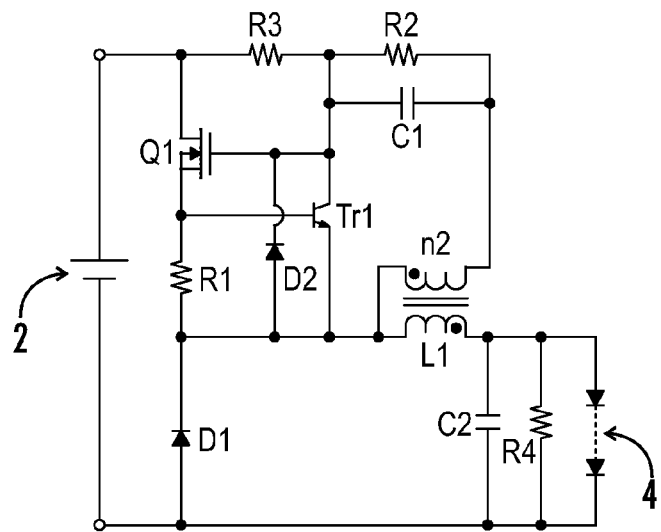
FIG. 7 is a circuit diagram of a lighting device as conventionally known in the art.

For example, a conventional circuit as represented in FIG. 7 may be modified in accordance with the present invention, where switching element Q1 is arranged on the higher potential side and controlled to be turned on and off by the self-exciting control circuit, when the diode D2 for conducting the regeneration current is replaced by a n-channel MOSFET (refer to the switching element Q2 of FIG. 1) to supply the low-frequency PWM signal to the gate electrode, the same state as that where the regeneration current flows (or the same state as that where the current flowing to the resistance R1 reaches a predetermined value) is realized during conduction of the n-channel MOSFET, and accordingly the dimming control according to the present invention can be carried out. In addition, during the normal oscillating operation, a reverse direction diode between the drain and source of the n-channel MOSFET also can be used as the diode D2 for conducting the regeneration current.

In the conventional example of FIG. 7, when the DC power source 2 is turned on, the switching element Q1 is turned on due to the start-up resistor R3. When the switching element Q1 is turned on current flows in a path from the DC power source 2 to the switching element Q1, the current sensor R1, the inductor L1, and then the capacitor C2, and an electromagnetic energy is accumulated in the inductor L1. On this occasion, a feedback voltage from the secondary winding n2 of the inductor L1 is supplied to the control terminal of the switching element Q1 via a parallel circuit of resistor R2 and capacitor C1, and thus the switching element Q1 continues the on-state.

When the current flowing to the switching element Q1 reaches a predetermined value, transistor Tr1 is turned on by the current sensor R1, and thus switching element Q1 is turned off. Then, an opposite direction electromotive force is generated in the secondary winding n2 of the inductor L1, the current flows to the parallel circuit of resistor R2 and capacitor C1 via the diode D2, the electric charge accumulated in the control terminal of the switching element Q1 is drawn, and the electric charge of the capacitor C1 is discharged.

In addition, the current due to the electromagnetic energy accumulated in the inductor L1 flows in a closed circuit of the inductor L1, the capacitor C2, and the diode D1, the capacitor C2 is charged, and the electromagnetic energy of the inductor L1 is consumed. When the electromagnetic energy of the inductor L1 is consumed, the diode D2 is turned off, and the switching element Q1 is turned on again by the start-up resistor R3. The same operations are repeated below, and the light emitting diode 4 is powered when the charging voltage of the capacitor C2 is raised to the above-mentioned n×Vf.

Again referring to a modified version of the conventional example of FIG. 7, when the diode D2 for conducting the regeneration current is replaced in accordance with the present invention by the n-channel MOSFET to supply the low-frequency PWM signal to the gate electrode, the above-mentioned self-exciting oscillating operation can be stopped and restarted in accordance with the High/Low states of the PWM signal, and dimming can be carried out based on the off-duty of the PWM signal. In addition, the n-channel MOSFET as a PWM switch also can be used as the diode D2 for conducting the regeneration current, and thus the number of components can be reduced.

Figure 5B:
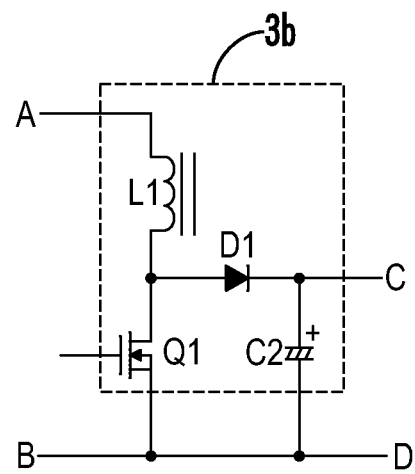
Figure 5C:
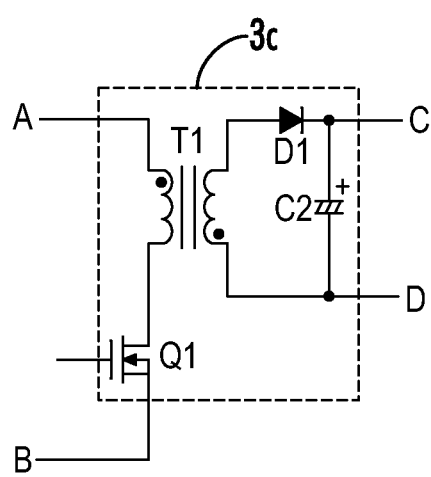
Figure 5D:
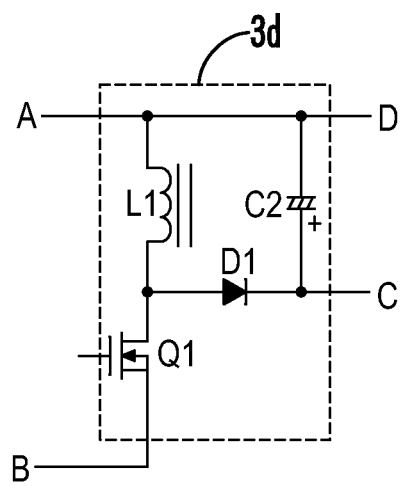

In addition, the present invention can be applied to various switching power source circuit types as shown in FIG. 5(b) to (d). FIG. 5(b) is an example of a step-up chopper circuit 3b, FIG. 5(c) is an example of a flyback converter circuit 3c, and FIG. 5(d) is an example of a step-up/step-down chopper circuit 3d. These are of course just examples, and accordingly if the switching power source circuit is configured to use a combination of: a peak current detection operation for controlling the switching element Q1 to be turned off when the current flowing to the inductance component (the inductor L1 or the transformer T1) at turning-on of the switching element Q1 reaches a predetermined value; and a zero-cross detection operation for controlling the switching element Q1 to be turned on when the current emitted via the regeneration diode D1 from the inductance component at turning-off of the switching element Q1 becomes substantially zero, the present invention can be applied to the switching power source circuit.

The present invention is further not limited to the example described above where the rectangular wave voltage signal of 1 kHz is used as the PWM signal. For example, after full-wave rectifying of phase-controlled AC voltage, the subsequently waveform-shaped voltage signal may be used as the low-frequency PWM signal.

The frequency of the PWM signal may preferably be set in a range roughly between about 100 Hz and 2 kHz. When the frequency of the PWM signal becomes less than 100 Hz, the blinking of the lighting output may be detected by human eyes. On the contrary, if the frequency of the PWM signal becomes higher than 2 kHz, since a length of the oscillation period where the switching element Q1 turns on and off in one cycle of the PWM signal becomes short when the dimming is strengthened, the on-pulse number of the switching element Q1 included in the oscillation period cannot be controlled precisely, the on-pulse number discretely changes, and thereby the resolution of the dimming is deteriorated.

In the case where the frequency of the PWM signal is an audible frequency (especially rasping frequency of, for example, 1 kHz), since a high-frequency noise such as a beep is generated from the chopper inductor L1, a countermeasure such as the adhering of a core and bobbin of the inductor and the securing them with varnish may preferably be carried out.

Meanwhile, in embodiments as previously described, since the output capacitor C2 is provided in parallel with the semiconductor light emitting element 4, even when the high-frequency switching operation of the switching element Q1 is intermittently stopped at the low-frequency in accordance with the PWM signal, the DC electricity flowing to the semiconductor light emitting element 4 becomes a smoothed current having less low-frequency ripples. That is, the semiconductor light emitting element 4 is continuously powered by the smoothed DC current based on the off duty (a ratio of a Low level period in one cycle) of the PWM signal. However, in a case where the output capacitor C2 is omitted or where the capacitance is designed to be relatively small, the semiconductor light emitting element 4 can be intermittently powered at the low frequency (i.e., the blinking and lighting at a high speed that cannot be felt by the eyes).

As described above, in the case where the lighting device varying the lighting output at low frequency is used for a room illumination or an outdoor night illumination, if a monitoring video camera is installed in an illumination area, it is preferred for the PWM signal to be set to an integral multiple of an inverse of shutter speed of the video camera. For example, if the shutter speed of the video camera is 1/60 second, the frequency of the PWM signal is set to be any one of 60 Hz, 120 Hz, 180 Hz, 240 Hz, 300 Hz, and so on. In addition, if the shutter speed of the video camera is 1/100 second, the frequency of the PWM signal is set to be any one of 100 Hz, 200 Hz, 300 Hz, 400 Hz, and so on. Equivalent mathematical relationships may accordingly be evident. If the setting is carried out in this manner, a video image of the video camera can be prevented from being watched with blinking even when the lighting output is varied at the low frequency.

Additionally, in the case where the lighting device according to the present invention is a light source device attached to the video camera, it is preferable that the PWM signal is switched in synchronization with the electric shutter of the video camera. For example, when a synchronization signal of the video camera is input to the lighting device and the semiconductor light emitting element is lit only during an exposure period in synchronization with the timing of electronic shutter of the video camera, it is not required to consume a wasteful lighting power, and accordingly power-saving can be achieved. As is commonly-known, a CCD type video camera has an electric charge accumulation period and an electric charge transfer period, a photo current of the photo diode serving as a pixel is accumulated as an electric charge of each pixel in the electric charge accumulation period, and since the photo current of the photo diode serving as the pixel is not accumulated in the electric charge transfer period, it is preferable that the illumination is turned off in this period. In this manner, and in the case where the video camera having the LED illumination is driven by a battery, the battery life can be extended.

Figure 6:
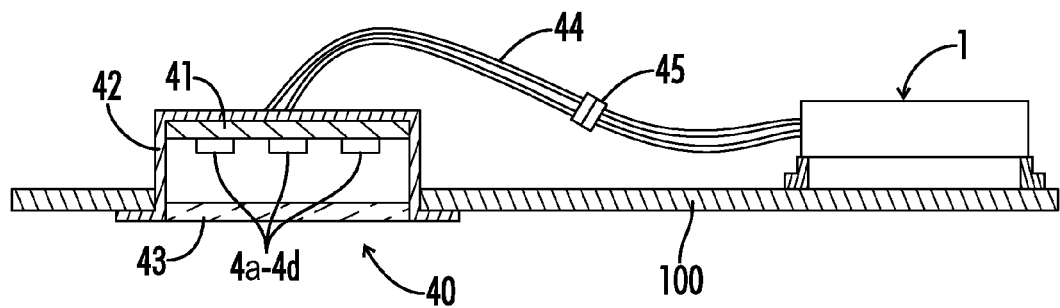
FIG. 6 is a cross sectional view showing a schematic configuration of an illumination fixture using a lighting device of the present invention.

Referring now to FIG. 6, an LED illumination fixture may be described having a separate power source that uses an LED lighting device according to the present invention. In the LED illumination fixture, the dimming lighting device 1 as a power source unit is incorporated in a case different from a chassis 42 of the LED module 40. In this manner, the LED module 40 can be made thinner, and the dimming and lighting device 1 as the separately-provided power source unit can be installed in any place.

A fixture chassis 42 includes a metallic cylinder body whose lower end is opened, and a lower end opening portion is covered with a light diffusion plate 43. An LED module 40 is arranged so as to face the light diffusion plate 43. An LED mounting substrate 41 mounts LEDs 4a to 4d of the LED module 40. The fixture chassis 42 is embedded in a ceiling 100, and is wired via the lead line 44 and the connector 45 from the dimming and lighting device 1 as the power source unit arranged under the roof.

In the dimming lighting device 1 as the power source unit, a circuit such as that represented in FIG. 3 may be housed. The series circuit of the LEDs 4a to 4d (the LED module 40) corresponds to the above-mentioned semiconductor light emitting element 4.

Figure 8:
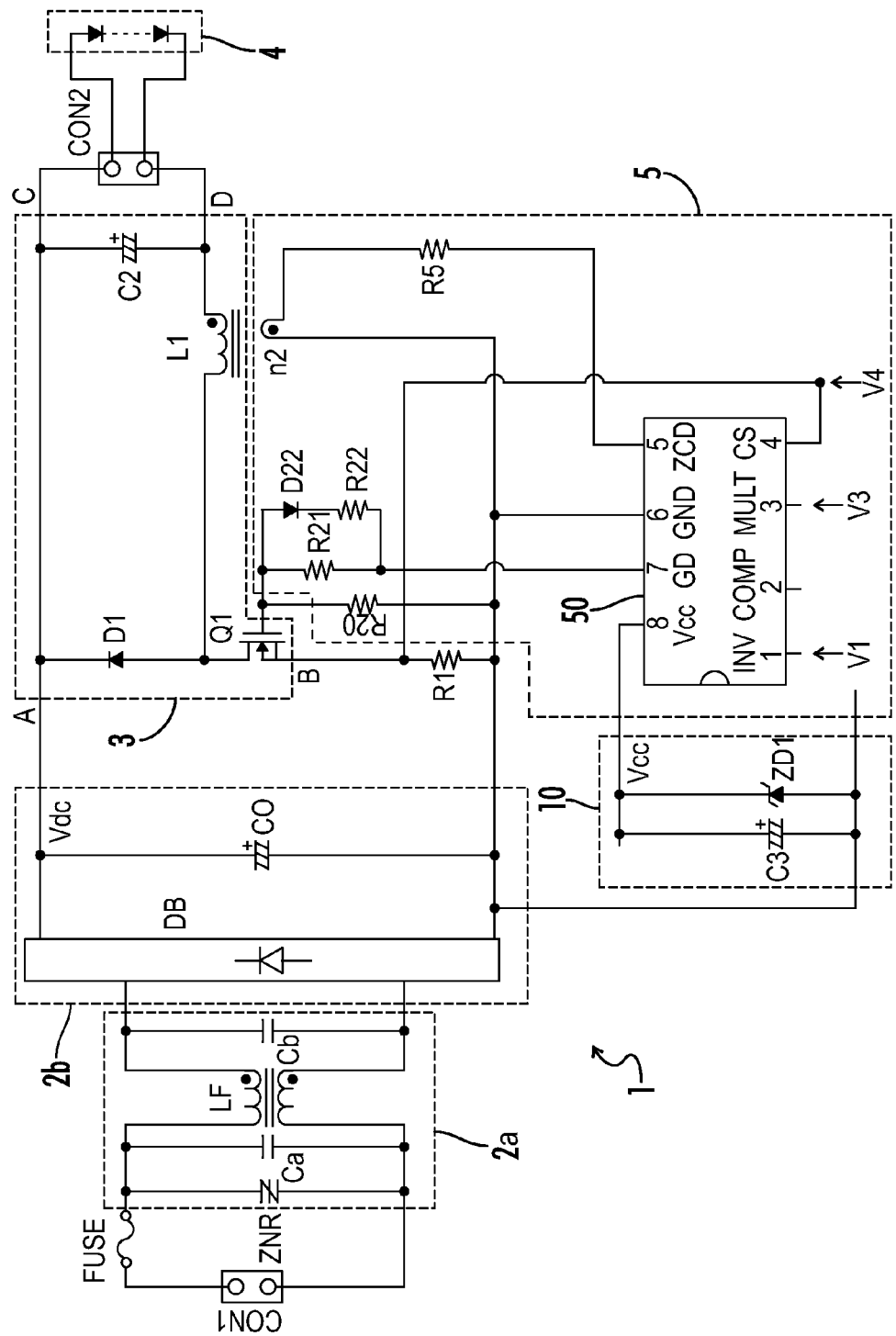
FIG. 8 is a circuit diagram representing another embodiment of a lighting device according to the present invention.
Figure 9:
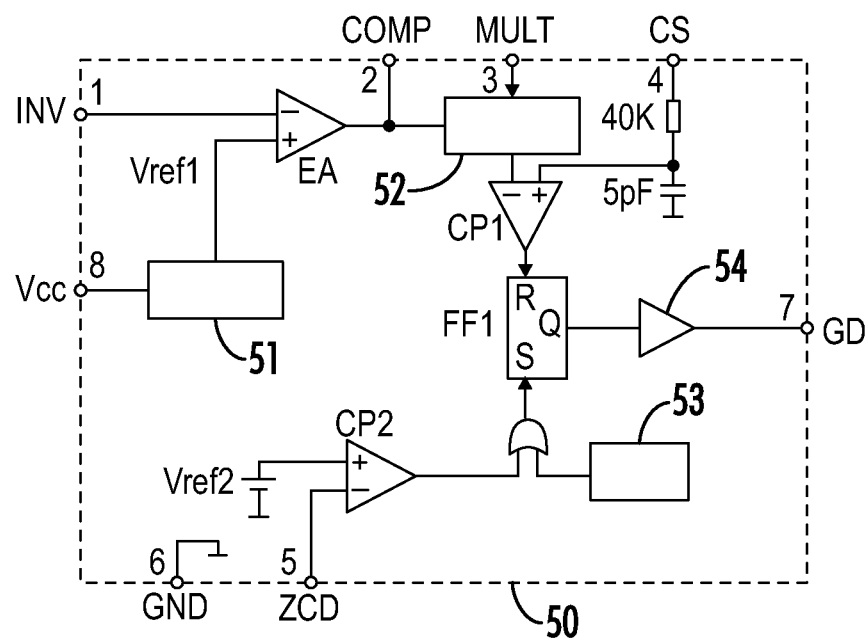
FIG. 9 is a circuit diagram representing an exemplary controller IC used for the lighting device of FIG. 8.

Referring now to FIG. 8, an embodiment of a lighting device of the present invention differs from the embodiment of FIG. 1 at least in that the switching element Q2 is not provided. In addition, when a peak value of a current flowing to the switch Q1 is changed, an average value of the chopper current is constantly a half (½) of the peak value of the current flowing to the switching element Q1, and accordingly dimming can be realized with high precision.

In such an embodiment the input voltage V1 of the first pin (INV) of the controller IC or the input voltage V3 of the third pin (MULT) can be controlled. Or, a correction value can be added to and subtracted from the input voltage V4 of the fourth pin (CS). Two or more such control operations may be combined, or only one of the same may be selected, as separately explained below.

Figure 11A:
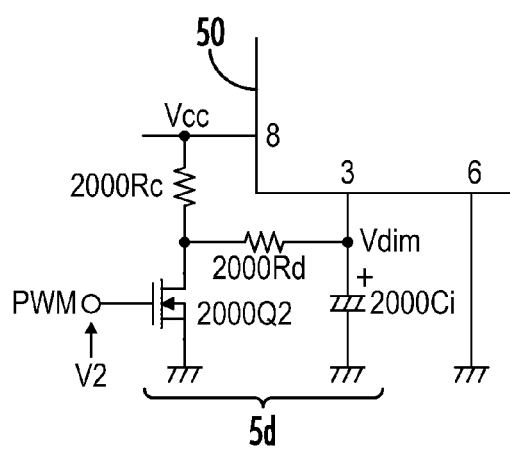
FIGS. 11(a) to 11(d) are circuit diagrams showing exemplary configurations for circuitry in the lighting device of FIG. 8.

In an example represented in FIG. 11(a), the input voltage V3 of the third pin (MULT) of the controller IC of the FIG. 8 is a dimming voltage Vdim depending on the duty of the low-frequency PWM signal, and the input voltage V1 of the first pin (INV) is a constant value.

Figure 10:
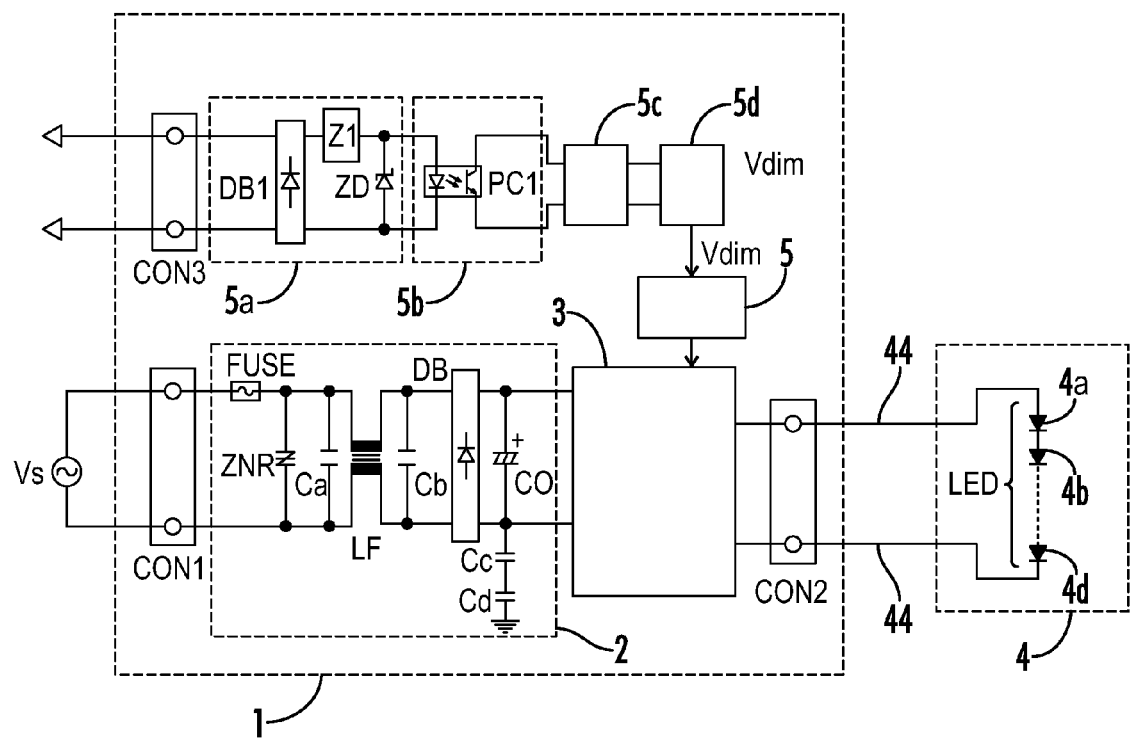
FIG. 10 is a circuit block diagram showing an embodiment of an LED dimming circuit using the lighting device of FIG. 8.

The low-frequency PWM signal is a rectangular wave voltage signal of, for example, 1 kHz, and is a dimming signal. The longer a Low level period is in one cycle, the larger the dimming output becomes. This type of PWM signal is widely used in dimming lighting devices for a fluorescent light and is, as shown in FIG. 10, supplied from a dimming signal line via the connector CON3 of the lighting device 1 and input to the DC conversion circuit 5d via the rectifier circuit 5a, the isolation circuit 5b, and the waveform shaping circuit 5c. In the DC conversion circuit 5d, the low-frequency PWM signal is converted into an analog dimming voltage Vdim. In the control circuit 5, the semiconductor light emitting element 4 is controlled to be dimmed in accordance with the analog dimming voltage Vdim.

In a simple configuration example of the DC conversion circuit 5d as shown in FIG. 11(a), the low-frequency PWM signal is the gate voltage V2 of a switching element 2000Q2. When the gate voltage V2 is High, the switching element 2000Q2 is turned on, and additionally when the gate voltage V2 is Low, the switching element 2000Q2 is turned off (a high impedance state).

While the switching element 2000Q2 is turned on, a node between the resistors 2000Rc and 2000Rd is Low. Accordingly, a charging electrode of an integral capacitor 2000Ci is discharged via the resistor 2000Rd and the switching element 2000Q2, and thus the voltage Vdim is lowered.

In the case where the switching element 2000Q2 is turned off, the integral capacitor 2000Ci is charged from the controller power source voltage Vcc via the resistors 2000Rc and 2000Rd, and thus the voltage Vdim rises. Accordingly, the voltage Vdim is increased and decreased on the basis of an off/on ratio of the switching element 2000Q2, and the longer the off period of the switching element 2000Q2 is, the more the voltage Vdim is increased.

Figure 11B:
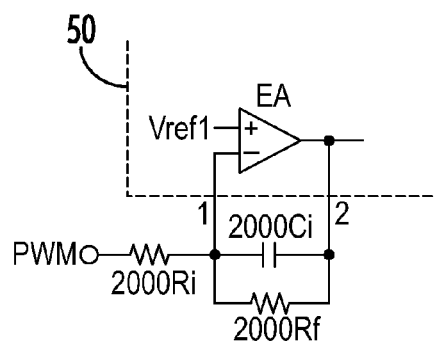

In another example as represented in FIG. 11(b), a CR integration circuit is configured by using an incorporated error amplifier EA provided between the first pin (INV) and the second pin (COMP) of the controller IC of FIG. 8, and is configured so that a dimming voltage based on the duty of the low-frequency PWM signal can be obtained in the output of the error amplifier EA.

To a plus (+) input terminal of the error amplifier EA, the reference voltage Vref1 is applied in the IC. A parallel circuit of an integration capacitor 2000Ci and a feedback resistor 2000Rf is coupled between an output terminal (a second pin) and a minus (−) input terminal (a first pin) of the error amplifier EA. The low-frequency PWM signal is input to the first pin of the error amplifier EA via the input resistor 2000Ri. Time constants of: the integral capacitor 2000Ci, the feedback resistance 2000Rf, and the input resistance 2000Ri may be designed so as to define a DC voltage obtained by approximately smoothing the voltage of the output terminal (the second pin) of the error amplifier EA.

When a Low-level period for the low-frequency PWM signal becomes long, the voltage of the output terminal (the second pin) of the error amplifier EA is increased, and accordingly the control is carried out such that the longer the Low-level period is, the larger the dimming output becomes.

Figure 11C:
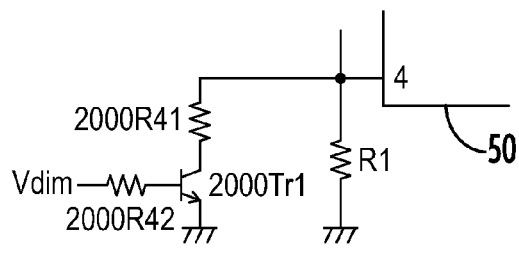

In another example as represented in FIG. 11(c), a series circuit of a resistance 2000R41 and a transistor Tr1 is coupled in parallel with the current sensor R1 coupled to the fourth pin (the chopper current detection terminal CS) of the controller IC of FIG. 8. The transistor Tr1 is used in an unsaturated region, and the resistance value is controlled to be variable on the basis of the analog dimming voltage Vdim.

When the analog dimming voltage Vdim becomes high, a base current supplied via a bias resistor 2000R42 to the transistor Tr1 increases, and accordingly the resistance value of the transistor Tr1 is lowered. Then, seen from the controller IC, since the same effect can be obtained as that of lowering the resistance value of the current sensor R1, the peak value of the current flowing to the switching element Q1 can be increased.

In other words, the semiconductor light emitting element 4 can be dimmed by subtracting a correction value based on a target brightening amount of the semiconductor light emitting element 4 from a detection value provided by the current sensor R1.

Figure 11D:
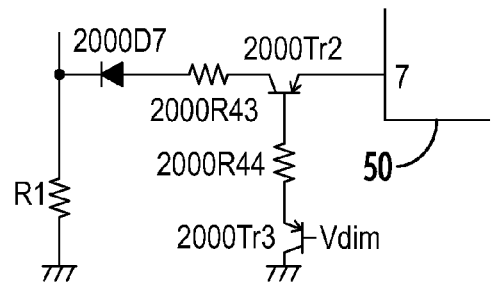

In another example as represented in FIG. 11(d), a circuit is provided for intermittently flowing a superimposed current from the seventh pin (the gate drive terminal GD) of the controller IC of FIG. 8 to a non-ground side terminal of the current sensor R1. The superimposed current flows when the seventh pin (the gate drive terminal GD) goes High, that is, only when the switching element Q1 of FIG. 8 is turned on, and accordingly the power consumption in the current sensor R1 can be suppressed in comparison with a constantly flowing superimposed current.

In the example shown, by making a PNP transistor Tr3 grounded by a collector operate in the emitter-follower manner, an impedance of the analog dimming voltage Vdim is reduced, and when the switching element Q1 is turned on, a current obtained by dividing a voltage difference between the output voltage of the seventh pin and the dimming voltage Vdim by the resistance 2000R44 is supplied to a base of the PNP transistor 2000Tr2. When the analog dimming voltage Vdim is lowered, the base current of the transistor 2000Tr2 is increased, and thus the current superimposed to the current sensor R1 via the resistor 2000R43 and the diode 2000D7 is increased. In this manner, the peak value of the current flowing to the switching element Q1 can be decreased.

That is, the semiconductor light emitting element 4 can be dimmed by superposing a correction value based on a target dimming amount of the semiconductor light emitting element 4 to the detection value detected by the current sensor R1.

Referring to FIG. 10, an overall configuration may be described of an LED dimming circuit 1 incorporating the lighting device of FIG. 8. The power source circuit 2 is configured by including the above-mentioned filter circuit 2a and DC power source circuit 2b. The capacitors Cc and Cd are used for connecting a circuit ground (a negative electrode of the capacitor C0) to a fixture chassis in a high-frequency manner. CON1 is a input terminal coupled to the commercially-available AC power source Vs, CON2 is the output connector coupled to the semiconductor light emitting element 4 via the lead line 44, and CON3 is a connector for connecting the dimming signal line. To the dimming signal line, a dimming signal including a duty-variable rectangular wave voltage signal having 1 kHz-frequency and 10V-amplitude is supplied.

The rectifier circuit 5a, isolation circuit 5b and waveform shaping circuit 5c may be substantially equivalent to those described with respect to an embodiment represented in FIG. 8 and described above. However, an exemplary dimming lighting device of FIG. 10 further includes a DC conversion circuit 5d including a low-pass filter such as the CR integral circuit (the smoothing circuit) after the waveform shaping circuit 5c, the analog dimming voltage Vdim is generated, and thereby the peak value of the switching element Q1 is controlled to be varied on the basis of the dimming voltage Vdim.

In the embodiment shown in FIG. 8, the switching element Q1 of the step-down chopper circuit 3 is arranged on a lower potential side. However, as shown in FIG. 5(a) and as previously described with respect to the embodiment of FIG. 3, it may be understood that the switching element Q1 of the step-down chopper circuit 3a may be arranged on a higher potential side. The configuration represented in FIG. 8 may further be applied to various types of switching power source circuits as shown in FIG. 5(b) to (d), and also as equivalently described above.

Figure 12:
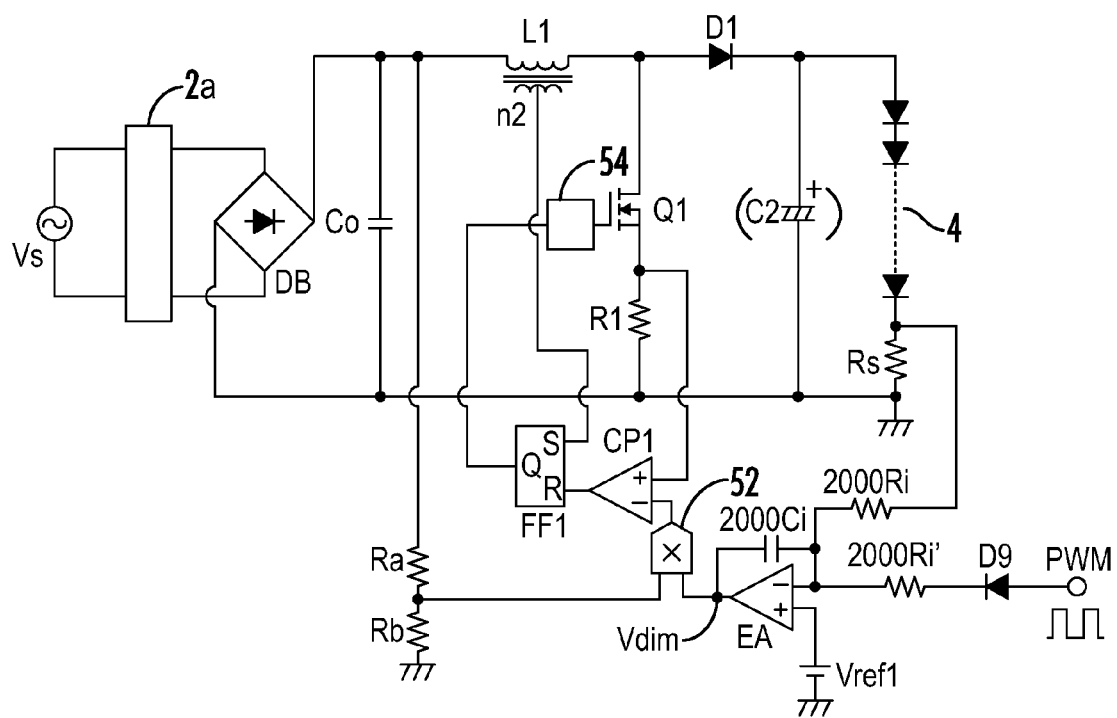
FIG. 12 is a circuit diagram representing an alternative configuration for the lighting device of FIG. 8.
Figure 13:
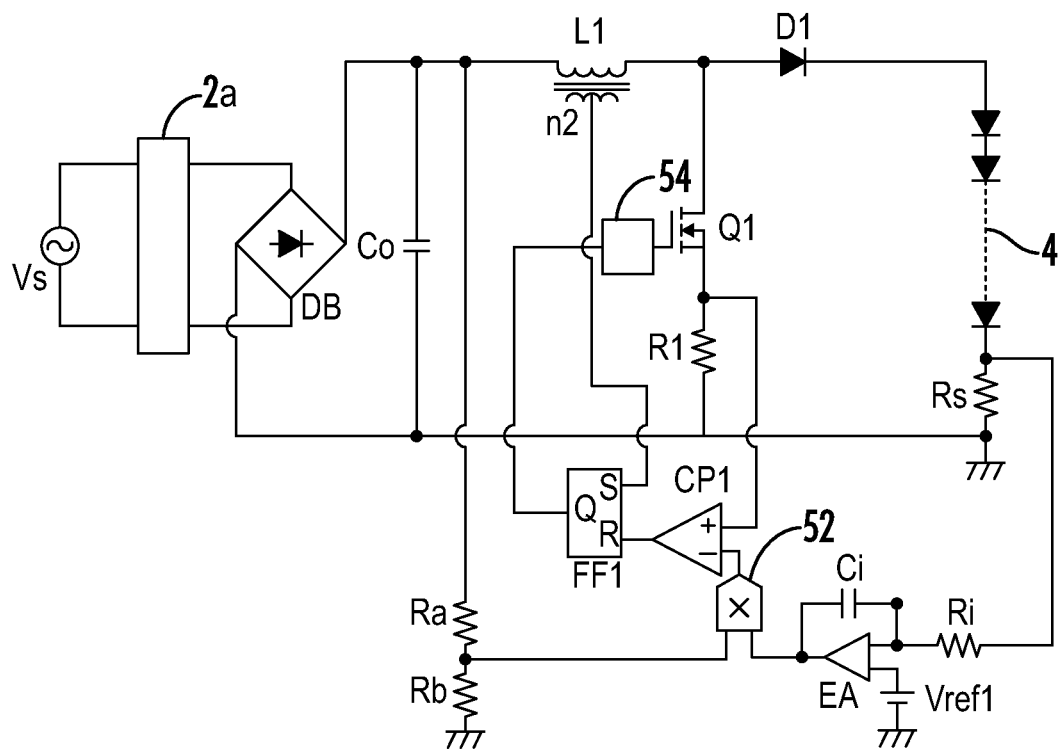
FIG. 13 is a circuit diagram representing another example of a lighting device as conventionally known in the art.

Referring now to FIG. 12, an embodiment of the lighting device of the present invention may be a modified version of a conventional example as represented in FIG. 13, so as to obtain the same or equivalent effect as that obtained when the reference voltage Vref1 is set to be variable, by adding a series circuit of an input resistor 2000Ri' and a diode D9, and carrying out the integration in a direction where the dimming voltage Vdim is lowered when the low-frequency PWM signal is High.

With respect to the configuration of FIG. 13, it is known in art that dimming control can be carried out by setting the reference voltage Vref to be variable. However, as described above, in the case where the L6562 manufactured by the ST Microelectronics Corporation is employed as the controller IC, the reference voltage Vref1 is incorporated in the IC, and accordingly cannot be variably controlled externally. Since the minus (−) input terminal and the output terminal of the error amplifier EA are exposed to the outside of the IC as the first pin and second pin, respectively, the time constants of the integral capacitor 2000Ci and the input resistor 2000Ri' coupled between the first and second pins are set to be a capacitance at which the low-frequency PWM signal can be smoothed, and when a High-level period for the PWM signal becomes long, the control is carried out so that the analog dimming voltage Vdim that is an output voltage of the error amplifier EA can be lowered. In this manner, the same effect can be obtained as that by lowering the reference voltage Vref1 in the IC.

From the other point of view, this obtains the same effect as that obtained by superposing a correction value based on the High level period of the PWM signal to a load current detected by the LED current sensor Rs. That is, even if an average value of the load current actually flowing to the semiconductor light emitting element 4 is smaller than the original current value determined by the reference voltage Vref1, the detected average value is inflated by superposing an integral current flowing via the input resistance 2000Ri' to the High level period of the PWM signal, it is determined that the target current is already achieved, and consequently the dimming is carried out.

For the circuit configuration of FIG. 12, the commercially-available AC power source Vs is coupled via the filter circuit 2a to the AC input terminal of the diode bridge DB. A capacitor Co having a relatively small capacitance for the high-frequency bypass is coupled in parallel to the DC output terminal of the diode bridge DB. The voltage across the capacitor C0 becomes a full-wave rectified pulsating voltage, is divided by a voltage-dividing circuit (e.g., resistors Ra and Rb), and is input to one of the input terminals of the multiplier circuit 52.

A positive electrode of the DC output terminal of the diode bridge DB is coupled to the drain electrode of the switching element Q1 and to the anode electrode of diode D1 via the inductor L1. The source electrode of switching element Q1 is coupled to a negative electrode of the DC output terminal of the diode bridge DB via the current sensor R1. The negative electrode of the DC output terminal of the diode bridge DB is coupled to circuit ground. The cathode electrode of diode D1 is coupled to the positive electrode of the smoothing capacitor C2, and the negative electrode of the smoothing capacitor C2 is grounded. A series circuit of the semiconductor light emitting element 4 and the LED current sensor Rs is coupled in parallel across the smoothing capacitor C2.

The non-ground side terminal of the LED current sensor Rs is coupled via the input resistor 2000Ri to the minus (−) input terminal of the error amplifier EA. The integral capacitor 2000Ci is coupled in parallel between the minus (−) input terminal and output terminal of the error amplifier EA. The series circuit of the diode D9 and the input resistor 2000Ri' is coupled between the minus (−) input terminal of the error amplifier EA and the PWM signal input terminal. The reference voltage Vref1 is applied to the plus (+) input terminal of the error amplifier EA. The voltage Vdim of the output terminal of the error amplifier EA is input to the other input terminal of the multiplier circuit 52.

The output voltage of the multiplier circuit 52 is applied to the minus (−) input terminal of the comparator CP1. The non-ground side terminal of the current sensor 2000R1 for detecting the current of the switching element Q1 is coupled to the plus (+) input terminal of the comparator CP1. The output terminal of the comparator CP1 is coupled to the reset input terminal R of the flip-flop FF1. The set signal is input to the set input terminal S of the flip-flop FF1 when the voltage of the secondary winding n2 of the inductor L1 disappears. The Q output of the flip-flop FF1 is supplied as the gate drive signal via the driving circuit 54 to the gate electrode of the switching element Q1.

Meanwhile, when a low-cost IC is used (refer for example to FIG. 9) which is configured by integrating the error amplifier EA, the multiplier circuit 52, the comparator CP1, the flip-flop FF1, and the driving circuit 54 in one chip, the manufacturing cost can be reduced.

An exemplary circuit operation for an embodiment as represented in FIG. 12 may now be explained. When the current of the inductor L1 stops flowing, the flip-flop FF1 is set in response to the disappearing of the output voltage of the secondary winding n2. When the flip-flop FF1 is set, a gate drive signal is supplied by the Q output to the switching element Q1 via the driving circuit 54, and thus the switching element Q1 is turned on. When the switching element Q1 is turned on, the input current is drawn in a path from the positive electrode of the DC output terminal of the diode bridge DB to the inductor L1, the switching element Q1, the current sensor R1, and then the negative electrode of the DC output terminal of the diode bridge DB, and the current flowing to the inductor L1 rises linearly.

The current flowing to the inductor L1 is detected by the current sensor R1, and is input as the detection voltage to the plus (+) input terminal of the comparator CP1. The output voltage of the multiplier circuit 52 is input as the reference voltage to the minus (−) input terminal of the comparator CP1. When the detection voltage of the plus (+) input terminal exceeds the reference voltage of the minus (−) input terminal, the output of the comparator CP1 goes High, and the flip-flop FF1 is reset. Then, the Q output of the flip-flop FF1 goes Low, the gate drive signal from the driving circuit 54 is forced Low, and accordingly the switching element Q1 is turned off.

When the switching element Q1 is turned off, a counter electromotive force is generated across the inductor L1 and superimposed to the output voltage of the diode bridge DB1, and the stepped-up voltage is charged to the smoothing capacitor C2 via the diode D1. On this occasion, the current flowing to the inductor L1 becomes a linearly-reducing current, and is drawn as the input current from the commercially-available AC power source. While the regeneration current flows to the inductor L1, an electromotive force is generated in the secondary winding n2. When the regeneration current of the inductor L1 finishes flowing, the voltage of the secondary winding n2 disappears, and at that time the flip-flop FF1 is set again. The same operations are substantially repeated below.

In this circuit, the down period of the input current is not generated, and accordingly the input power factor becomes high. In addition, since the peak value of the input current is regulated by the output voltage of the multiplier circuit 52, an envelope line of the input current will be proportional to the pulsating voltage obtained by full-wave rectifying the commercially-available AC voltage, the input current and the input voltage will be substantially directly proportional to each other by removing the high-frequency components of the input current with the filter circuit 2a, and thus harmonic distortion of the input current is reduced.

The other input voltage of the multiplier circuit 52 is the dimming voltage Vdim as the output voltage of the error amplifier EA. The dimming voltage Vdim is controlled to minimize a difference between the average value of the load current of the semiconductor light emitting element 4 (the load current being detected by the LED current sensor Rs) and the reference voltage Vref1. That is, in the case where the average load current value of the semiconductor light emitting element 4 is smaller than a target value, the dimming voltage Vdim becomes large, and the control is carried out to increase the peak value of the current flowing to the switching element Q1. Alternatively, where the average load current value of the semiconductor light emitting element 4 is larger than the target value, the dimming voltage Vdim becomes small, and the control is carried out to decrease the peak value of the current flowing to the switching element Q1. In this manner, even when the power source voltage and/or the temperature are varied, the average value of the detected load current of the semiconductor light emitting element 4 is controlled in a feedback operation so as to converge to the target value.

However, in the circuit of FIG. 12, since the PWM signal is added to the input of the integral circuit via the series circuit of the input resistor 2000Ri' and the diode D9, when the average value of the PWM signal (that is the on-duty) becomes large, the circuit operates as if the average value of the load current is increased, and if the average value of the actual load current is lower than the target value, the feedback control becomes stable at the operating point. Accordingly, the dimming control can be carried out so that the average value of the load current can be small as the on-duty of the PWM signal becomes large.

Meanwhile, the load current detected by the LED current sensor Rs is smoothed by an integral circuit including the resistor 2000Ri and the capacitor 2000Ci, and accordingly the operation can be carried out without a smoothing capacitor C2. However, in the case where the smoothing capacitor C2 is used as shown in FIG. 12, there may be an advantage in that the peak current flowing to the semiconductor light emitting element 4 can be reduced and a lighting output having small high-frequency ripples can be obtained.

The embodiment described above includes the step-up chopper circuit shown in FIG. 5(b). However, the same control as that of the present embodiment may be applied to the configurations of FIG. 8 and FIGS. 5(a), 5(b), and 5(c).

The LED lighting device of various embodiments such as represented for in example in FIGS. 8 and 12 can be configured as the LED illumination fixture having an external power source shown in FIG. 6 in an equivalent manner to that previously described. The details are omitted.

Figure 14:
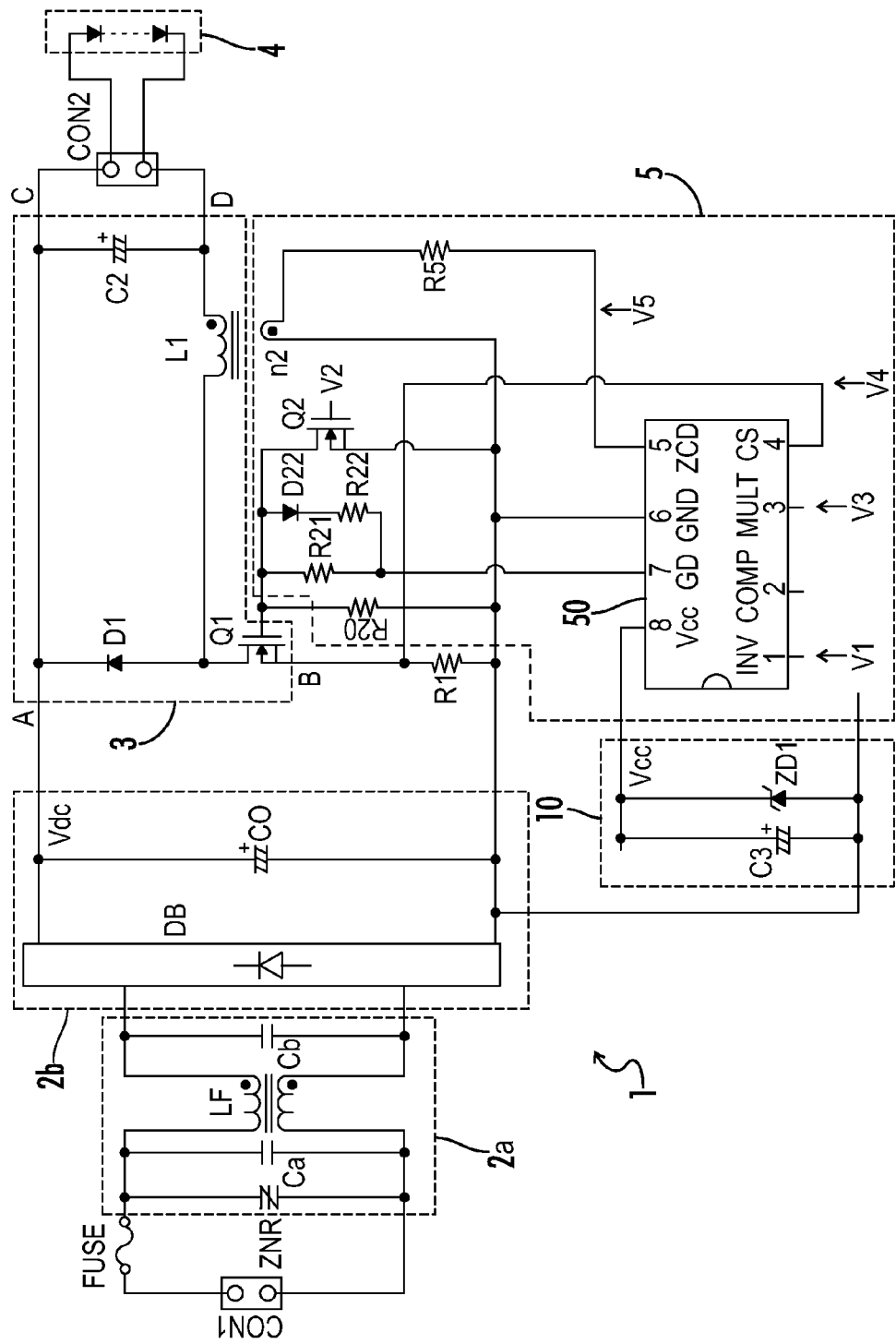
FIG. 14 is a circuit diagram representing another embodiment of a lighting device according to the present invention.

Referring now to FIG. 14, another embodiment of a lighting device according to the present invention is substantially similar in configuration to that represented in FIG. 1 (and previously described) with respect to the input terminal CON1, output connector CON2, semiconductor light emitting element 4, filter circuit 2a, full-wave rectifying and smoothing circuit 2b, the step-down chopper circuit 3, and certain portions of the control circuit 5 as may be determined from observation and in view of the description below.

Generally speaking with respect to the present embodiment, the average value of the chopper current changes little in response to differences in the load. Accordingly, an effective value of the output current supplied to the load by smoothing the pulsating components of the chopper current with the output capacitor C2 will be substantially constant regardless of the load.

Then, when the high-frequency chopper operation is intermittently disabled in accordance with the low-frequency PWM signal, the output current depending on the duty of the PWM signal can be supplied to the semiconductor light emitting element 4, and thereby dimming can be realized with high precision. For this purpose, in a first dimming operation for an embodiment as represented in FIG. 14, the gate voltage V2 of the switching element Q2 is controlled in accordance with the low-frequency PWM signal.

In addition, when the peak value of the current flowing to the switch Q1 is changed, the average value of the chopper current is constantly a half (½) of the peak value of the current flowing to the switching element Q1, and accordingly dimming can be realized with high precision. For this purpose, in a second dimming operation for the embodiment represented in FIG. 14, the input voltage V1 of the first pin (INV) of the controller IC or the input voltage V3 of the third pin (MULT) can be controlled.

The first dimming operation for controlling the switching element Q2 to be turned on/off in accordance with the low-frequency PWM signal may be carried out in a substantially equivalent manner to that previously described above.

In addition to, or instead of, the above-mentioned on-off control of the switching element Q2, the oscillating operation of the controller IC may be controlled to be intermittently stopped by shorting the fifth pin (ZCD) of the controller IC to ground in synchronization with the low-frequency PWM signal. As described above, in the case where the L6562 manufactured by the ST Microelectronics Corporation is employed as the controller IC, the disable circuit 55 is coupled to the fifth pin (ZCD) as the zero-cross detection terminal as shown in FIG. 2, and accordingly when the fifth pin is shorted to ground operation of the IC can be disabled. Then, when the low-frequency PWM signal is High, the fifth pin (ZCD) is shorted to ground to disable operation of the IC, and when the low-frequency PWM signal is Low, the fifth pin (ZCD) is opened to return to normal operation. In this manner, dimming can be carried out on the basis of the ratio between the Low and High level periods of the low-frequency PWM signal.

Referring back to the DC signal conversion circuit 5d of FIG. 10, the PWM signal supplied from the dimming signal line may be output after being converted into a second PWM signal having a different pulse width, or may be output in the original pulse width. Additionally, in the signal conversion circuit 5d, the analog dimming voltage Vdim is output which varies according to the pulse width of the PWM signal. The dimming voltage Vdim is used in the second dimming operation.

In the present embodiment, the input voltage V1 of the first pin (INV) or the input voltage V3 of the third pin (MULT) of the controller IC can be controlled based on the analog dimming voltage Vdim output from the DC conversion circuit 5d. Since the peak value of the current flowing to the switching element Q1 can be varied, dimming can be carried out in this manner.

When the peak value of the current flowing to the switching element Q1 is increased, the operating (on-off) frequency of the switching element Q1 becomes low. Alternatively, when the peak value is decreased, the on-off frequency of the switching element Q1 becomes high. A first slope of a gradually-increasing current flowing to the inductor L1 when the switching element Q1 is turned on and a second slope of a gradually-reducing current flowing to the inductor L1 when the switching element Q1 is turned off are constant if the power source voltage Vdc is equal to the load voltage Vc2. That is, as the peak value of the current flowing to the switching element Q1 is increased and decreased, the chops formed by the gradually-increasing current and the gradually-decreasing current flowing to the inductor L1 maintain a similar shape, and thus a proportional relationship can be maintained between the on-off cycle of the switching element Q1 and the peak value of the current flowing to the switching element Q1.

Accordingly, in order to restrict the operating (on-off) frequency of the switching element Q1 to a predetermined maximum frequency fmax or less, it is required to restrict the peak value of the current flowing to the switching element Q1 to a predetermined minimum value Imin or more. In order to further restrict the on-off frequency of the switching element Q1 to the predetermined minimum frequency fmin or more, the peak value of the current flowing to the switching element Q1 is restricted to be the predetermined minimum value Imax or less.

In this manner, the peak value of the current flowing to the switching element Q1 may be restricted in a range from the predetermined minimum value Imin to the predetermined maximum value Imax, by restricting a voltage range of the analog dimming voltage Vdim output from the DC conversion circuit 5d.

An example may now be described wherein the first and second dimming operations are combined, with further reference to the configurations of FIGS. 10 and 14, and the dimming operations exemplified in FIGS. 15(a) to 15(e). The signal conversion circuit 5d of FIG. 10, including for example a microprocessor, reads the pulse width of the PWM signal output from the waveform shaping circuit 5c, and after converting the pulse width into a digital value the analog dimming voltage Vdim is generated and the second PWM signal having a converted pulse width is output.

Figure 15A:
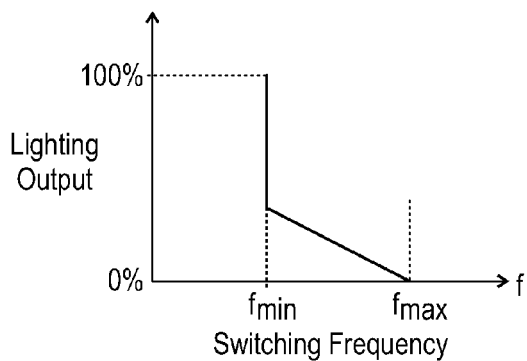
FIGS. 15(a) to 15(e) are graphical diagrams showing a dimming control example for the lighting device of FIG. 14.

In the example of FIG. 15(a), the lighting output is reduced only by the first dimming operation to intermittently stop the on-off operation of the switching element Q1 in a process where the lighting output is lowered from 100% to a predetermined dimming output (e.g., lighting output 30%). In addition, on a lower brightness side than the predetermined dimming output (e.g., <30%), the lighting output is reduced only by the second dimming operation to reduce the peak value of the current flowing to the switching element Q1, or the lighting output is reduced by using the first and second dimming operations in combination.

An advantage to such a control operation is that dimming can be carried out smoothly on the low brightness side. When only using the first dimming operation to intermittently stop the on-off operation of the switching element Q1, when a period of the intermittent oscillation is short the number of on-pulses of the switching element Q1 included in the intermittent oscillation period becomes small (for example, one to a few pulses), and variation of the lighting output with respect to changes of the intermittent oscillation may be discrete. This can however be substantially prevented by reducing the peak value of the current flowing to the switching element Q1 when the on-off frequency of the switching element Q1 is increased, such that the on-pulse number of the switching element Q1 included in the intermittent oscillation period can be increased. Since the peak value of the current flowing to the switching element Q1 can be continuously adjusted, the effective value of the load current can also be continuously adjusted, and thus the smooth dimming can be carried out, especially on the low brightness side.

Figure 15B:
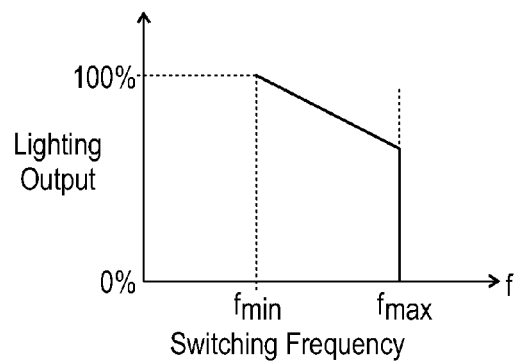

In the example of FIG. 15(b), in a process where the lighting output is lowered from 100% to a predetermined dimming output (e.g., lighting output 70%), the lighting output is reduced only by the second dimming operation to reduce the peak value of the current flowing to the switching element Q1, or the lighting output is reduced by using the second dimming operation and the first dimming operation in combination. On a lower brightness side than the predetermined dimming output (e.g., <70%), the lighting output is reduced only by the first dimming operation to intermittently stop the on-off operation of the switching element Q1.

Accordingly, since the dimming control on the low brightness side by the first dimming operation (to periodically interrupt on-off operation of the switching element Q1) is carried out at the maximum frequency fmax, a maximum number of on-pulses of the switching element Q1 are included in the intermittent oscillation period, and thus the variation of the lighting output is smoothed with respect to the change of the length of the intermittent oscillation period.

Figure 15C:
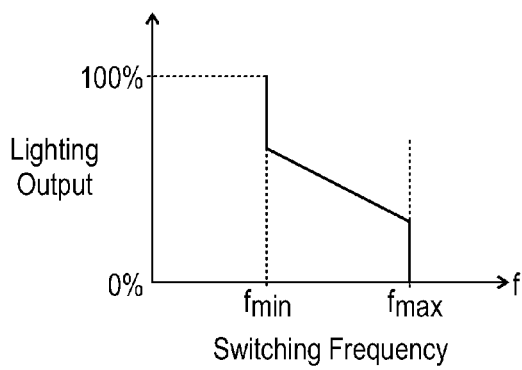

The example of FIG. 15(c) is a combination of the control operations previously described with respect to FIGS. 15(a) and 15(b). Where the lighting output is lowered from 100% to the first dimming output (e.g., lighting output 70%), only the first dimming operation is applied to periodically interrupt on-off operation of the switching element Q1. Where the lighting output is lowered from the first dimming output to the second dimming output (e.g., lighting output 30%), only the second dimming operation is used to reduce the peak value of the current flowing to the switching element Q1, or alternatively the first and second dimming operations are used in combination. Finally, the lighting output is reduced only by the first dimming operation at brightness levels lower than the second dimming output (e.g., <30%).

Figure 15D:
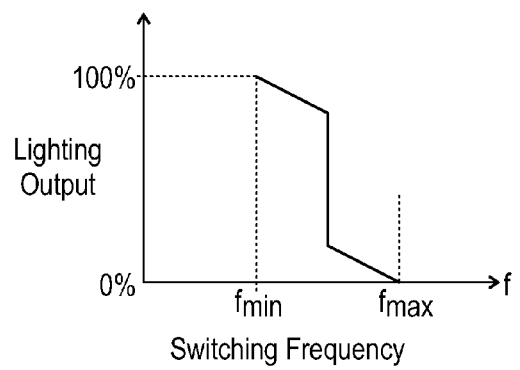

The example of FIG. 15(d) is also a combination of the controls of FIGS. 15(a) and 15(b). Where the lighting output is lowered from 100% to the first dimming output (e.g., lighting output 80%), only the second dimming operation is used to reduce the peak value of the current flowing to the switching element Q1, or alternatively the lighting output is reduced using the first and second dimming operations in combination. Where the lighting output is lowered from the first dimming output to the second dimming output (e.g., lighting output 20%), only the first dimming operation is used to intermittently stop the on-off operation of the switching element Q1. Finally, for brightness levels lower than the second dimming output (e.g., <20%), only the second dimming operation is used to reduce the peak voltage of the current flowing to the switching element Q1, or alternatively the first and second dimming operations are used in combination.

Figure 15E:
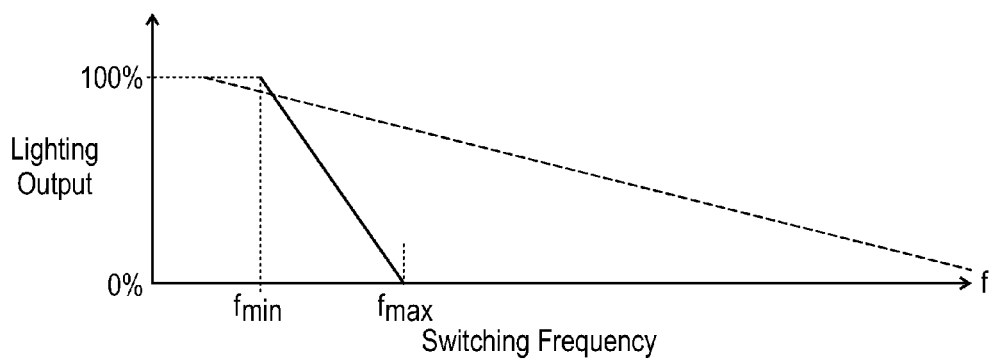

The example of FIG. 15(e) controls the lighting output by constantly combining the first dimming operation to intermittently stop the on-off operation of the switching element Q1 and the second dimming operation to reduce the peak voltage of the current flowing to the switching element Q1. When the lighting output is 100%, the on-off frequency f of the switching element Q1 becomes the minimum frequency fmin, and the peak value of the current flowing to the switching element Q1 becomes the maximum. Additionally, during a period in which on-off operation of the switching element Q1 is disabled, the peak value becomes the minimum. When the lighting output is at a minimum (e.g., 1%), the on-off frequency f of the switching element Q1 becomes the maximum frequency fmax, and the peak value of the current flowing to the switching element Q1 becomes the minimum. Additionally, during the period in which the on-off operation of the switching element Q1 is disabled, the peak value becomes the maximum. Thus, even when the lighting output is varied in a broad range as shown by a solid line of FIG. 15(e), the on-off frequency f of the switching element Q1 is restricted in a range from the predetermined minimum frequency fmin to the maximum frequency fmax.

Compared to this, the characteristic represented by a broken line in FIG. 15(e) shows that when the lighting output is increased and decreased only by the second dimming operation to increase and decrease the peak value of the current flowing to the switching element Q1, such as is applied in conventional methods, the on-off frequency f of the switching element Q1 varies in a broad range. Since the effective value (the average value) of the load current is proportional to the peak value of the current flowing to the switching element Q1, in order to variably control the lighting output, for example in a range from 100% to 1% with only use of the second dimming operation, the peak value of the current flowing to the switching element Q1 has to be changed in a range of 100:1. On this occasion, since the on-off frequency of the switching element Q1 varies in a range of 1:100, a ratio between the minimum frequency and the maximum frequency becomes hundredfold and accordingly is not practical.

However, in order to restrict the ratio between the minimum frequency fmin and the maximum frequency fmax to be, for example, 1:2, a dimming ratio is from 100% to 50%, and also is not practical.

Thus, the peak value of the current flowing to the switching element Q1 is controlled in combination with an operation for periodic low-frequency interruption of on-off operation of the switching element Q1 and varying the length of the interrupt (stopping) period. In this manner, as represented by the solid line (the present invention) of FIG. 15(e), the lighting output is controllable in a broad range, and additionally the on-off frequency f of the switching element Q1 can be restricted in a range between the predetermined maximum frequency fmax and the predetermined minimum frequency fmin.

Meanwhile, high-frequency components in the range between the predetermined maximum frequency fmax and the predetermined minimum frequency fmin can be suppressed by the filter circuit 2a to be equal to or less than a noise regulation level such as required by for example the CISPR.

An overall configuration of an LED dimming circuit 1 incorporating the lighting device of FIG. 14 may be substantially equivalent to that shown in FIG. 10, such as for example with respect to the power source circuit 2, the input terminal CON1, the output connector CON2 coupled to the semiconductor light emitting element 4 via the lead line 44, the connector CON3 for connecting the dimming signal line to receive a dimming signal, the rectifier circuit 5a, the isolation circuit 5b, and the waveform shaping circuit 5c.

The signal conversion circuit 5d including a microprocessor is further provided after the waveform shaping circuit 5c for generating the analog dimming voltage Vdim, and thereby the current peak value of the switching element Q1 is controlled to be varied on the basis of the dimming voltage Vdim. In addition, the second PWM signal having a different pulse width than that of the dimming input signal is generated, and the period during which the on-off operation of the switching element Q1 is intermittently stopped on the basis of the converted pulse width of the PWM signal is variably controlled.

The signal conversion circuit 5d is not so limited to the microprocessor, and may include for example a mono-stable multi-vibrator for converting the pulse width, a CR smoothing circuit for generating the dimming voltage Vdim, and the like. In addition, it is not necessarily required to convert the pulse width of the PWM signal via the signal conversion circuit 5d, and the PWM signal may be allowed to pass directly through wherein only the dimming voltage Vdim is generated based on the pulse width.

In embodiments consistent with the configuration represented in FIG. 14, the second dimming operation to change the peak value of the current flowing to the switching element Q1 may be conducted by controlling the input voltage V1 of the first pin (INV) or the input voltage V3 of the third pin (MULT) of the controller IC on the basis of the analog dimming voltage Vdim output from the signal conversion circuit 5d. However, in an alternative example the second dimming operation may be realized by adding and subtracting a correction value based on the dimming voltage Vdim to and from the input voltage V4 (at the fourth pin (CS) of the controller IC of FIG. 14) to adjust the peak value of the current flowing to the switching element Q1.

Referring now to FIG. 16(a), a series circuit of a resistor 3000R41 and transistor 3000Tr1 is coupled in parallel with the current sensor R1 coupled to the fourth pin (the chopper current detection terminal CS) of the controller IC of FIG. 14. The transistor 3000Tr1 is used in an unsaturated region, and the resistance value is variably controlled on the basis of the analog dimming voltage Vdim.

When the analog dimming voltage Vdim becomes high, the base current supplied via the bias resistor 3000R42 to transistor 3000Tr1 is increased, and accordingly the resistance value of the transistor 3000Tr1 is lowered. Then, seen from the controller IC, since the same effect as that obtained by reduction of the resistance value of the current sensor R1 can be obtained, the peak value of the current flowing to the switching element Q1 can be increased.

That is, the semiconductor light emitting element 4 can be dimmed by subtracting the correction value based on a target brightness amount of the semiconductor light emitting element 4 from the detection value detected by the current sensor R1.

Referring to FIG. 16(b), a circuit is provided for intermittently flowing a superimposed current from the seventh pin (the gate drive terminal GD) of the controller IC of FIG. 14 to a non-ground side terminal of the current sensor R1. The superimposed current flows at timing when the seventh pin (the gate drive terminal GD) is forced High, that is, only in a period when the switching element Q1 of FIG. 14 is turned on, and accordingly the power consumption in the current sensor R1 can be suppressed in comparison with a constantly flowing superimposed current.

In the example shown, by making a PNP transistor 3000Tr3 grounded by a collector operate in the emitter-follower manner an impedance of the analog dimming voltage Vdim is reduced, and when the switching element Q1 is turned on a current obtained by dividing a voltage difference between the output voltage of the seventh pin and the dimming voltage Vdim by the resistance 3000R44 is supplied to a base of the PNP transistor 3000Tr2. When the analog dimming voltage Vdim is lowered, the base current of the transistor 3000Tr2 is increased, and thus the current superimposed to the current detection resistance R1 via the resistance 3000R43 and the diode 3000D7 is increased. In this manner, the peak value of the current flowing to the switching element Q1 can be decreased.

That is, the semiconductor light emitting element 4 can be dimmed by superposing a correction value based on the target brightness amount of the semiconductor light emitting element 4 to a value detected by current sensor R1.

Figure 16C:
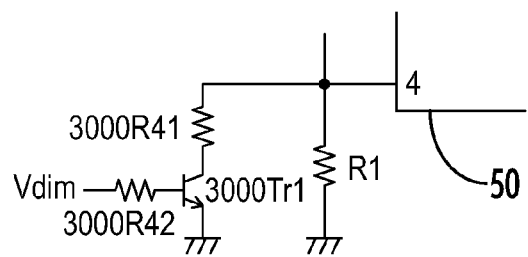
Figure 16C:
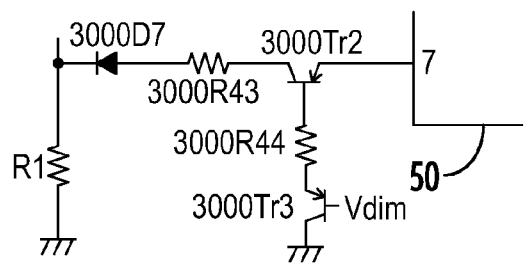
Figure 16C:
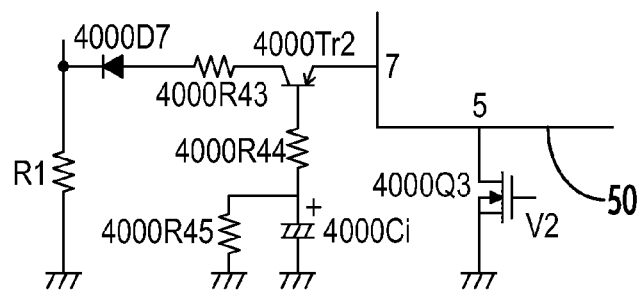

In the example of FIG. 16(c), the dimming voltage Vdim is generated by integrating the gate drive signal from the seventh pin (the gate drive terminal GD) of the controller IC of FIG. 14 via a smoothing circuit including the resistors 3000R44, 3000R45 and the capacitor 3000Ci. Since the smoothing circuit in the present embodiment serves as the signal conversion circuit for generating the DC voltage based on the High level period of the PWM signal, the signal conversion circuit 5d is not required, and the PWM signal output from the waveform shaping circuit 5c is used directly as the driving voltage V2 of the switching element Q2 of FIG. 14. Moreover, in the period when the PWM signal output from the waveform shaping circuit 5c is High, the fifth pin of the controller IC is shorted to circuit ground to disable oscillating operation of the controller IC.

As previously described, in the case where the L6562 manufactured by the ST Microelectronics Corporation is employed as the controller IC, the disable circuit 55 is coupled to the fifth pin (ZCD) serving as the zero-cross detection terminal as shown in FIG. 2, and when the fifth pin is shorted to the ground, operation of the IC can be disabled. Then, when the low-frequency PWM signal (the gate voltage V2 of the switching element Q2 of FIG. 14) is High, the switching element 4000Q3 of FIG. 16(c) is turned on, the IC is disabled by shorting the fifth pin (ZCD) to the ground, and thereby the gate drive signal is not output from the gate drive terminal GD. The time constants of the resistors 4000R44, 4000R45 and the capacitor 4000Ci are set so that the charging voltage of the capacitor 4000Ci can be controlled based on the effective value of the gate drive signal.

The circuit as represented in FIG. 16(c) is configured by coupling a series circuit of the capacitor 4000Ci, to which the discharging resistor 4000R45 is coupled in parallel, and the charging resistor 4000R44 between the base of the transistor 4000Tr2 and circuit ground, coupling the emitter of the transistor 4000Tr2 to the gate drive terminal GD (the seventh pin) of the controller IC, and coupling a corrector to the non-ground side terminal of the current sensor R1 via the series circuit of the resistor 4000R43 and the diode 4000D7.

When the High-level period of the low-frequency PWM signal becomes long, a period of gate drive signal output from the gate drive terminal GD (the seventh pin) of the controller IC becomes short, and accordingly the charging voltage of the capacitor 4000Ci is lowered. Then, the base current of the transistor 4000Tr2 is increased when the switching element Q1 is turned on, and accordingly the current superimposed via the resistor 4000R43 and the diode 4000D7 to the current sensor R1 is increased. Hence, the period when the switching element Q1 is turned on becomes short and the peak current is decreased.

On the contrary, when the High level period of the low-frequency PWM signal is short, the period of gate drive signal output from the gate drive terminal GD (the seventh pin) of the controller IC becomes long, and accordingly the charging voltage of the capacitor 4000 Ci becomes high. Then, since the base current of the transistor 4000Tr2 is decreased when the switching element Q1 is turned on, the current superimposed to the current sensor R1 via the resistor 4000R43 and the diode 4000D7 is decreased. Accordingly, the on-period of the switching element Q1 becomes long and the peak current is increased.

The dimming operations shown in FIGS. 15(a) and 15(b) can thereby be realized using the exemplary circuit configurations described above. In addition, a soft starting function can also be provided in which the lighting output is gradually increased while the capacitor 3000Ci is charged at turning-on of the power source.

The switching element Q1 of the step-down chopper circuit 3 as shown in FIG. 14 is arranged on the lower potential side, but as with previously described embodiments it may be understood that the switching element Q1 may be arranged on a higher potential side, as shown in FIG. 5(a). The lighting device of FIG. 14 and the modified examples may for example be applied to various types of the switching power source circuit as shown in FIGS. 5(b) to 5(d), where the switching power source circuit as previously described above is configured to use a combination of a peak current detection operation and a zero-cross detection operation.

The LED lighting device of FIG. 14 and the modified examples can be configured as the LED illumination fixture with separate power source in the same manner as other embodiments described above, and further details may be omitted as redundant with respect to the above-mentioned explanation of FIG. 6.

Figure 17:
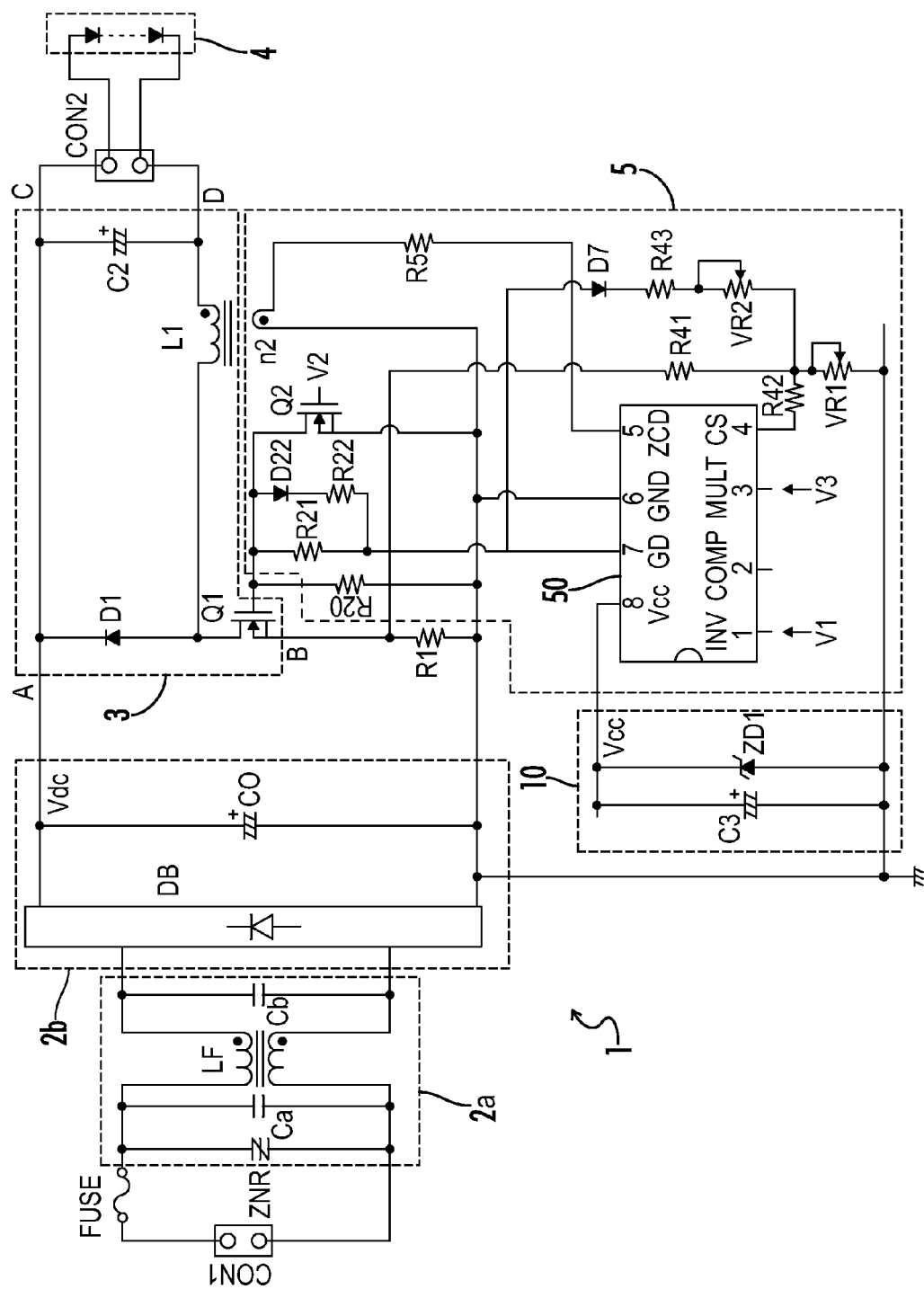
FIG. 17 is a circuit diagram representing another embodiment of a lighting device according to the present invention.

Referring now to FIG. 17, in another embodiment a lighting device according to the present invention is substantially similar in configuration to embodiments previously described with respect to FIGS. 1 and 14, with the exception being a circuit coupled to pin 4 of the controller IC 50 and as further described below.

The detection voltage from the current sensor R1 is input to the fourth pin (CS) of the controller IC via the resistors R41 and R42. A variable resistor VR1 for adjusting current detection sensitivity couples a node between the resistors R41 and R42 to circuit ground. When a resistance value of the variable resistor VR1 is lowered, since the detection voltage of the current sensor R1 is divided by the resistor R41 and the variable resistor VR1 and is input to the fourth pin (CS), the current detection sensitivity can be lowered, and thereby the peak value of the current flowing to the switching element Q1 can be raised.

In addition, a DC signal is superimposed to the variable resistor VR1 from the seventh pin (GD) to supply the gate drive voltage of the switching element Q1 via the diode D7, the resistor R43, and the variable resistor VR2. Since the superimposed current via the variable resistor VR2 flows when the seventh pin (the gate drive terminal GD) is forced High, that is, only in the period when the switching element Q1 is turned on, the power consumption can be reduced in comparison with the case of constant flow of the superimposed current. When the resistance value of the variable resistor VR2 is lowered, the superimposed DC signal is increased, the voltage of the fourth pin (CS) is increased, and accordingly the peak value of the current flowing to the switching element Q1 can be lowered.

The peak value of the current flowing to the switching element Q1 can be appropriately set by adjusting the two variable resistors VR1 and VR2. An example of an appropriate setting may be where the upper limit value is in a range where the inductor L1 is not magnetically saturated and in a range where the upper limit value does not exceed a maximum peak current of the switching element Q1, and the lower limit value is in a range where the operation frequency of the switching element Q1 does not become too high.

A constant current characteristic control method may be utilized in operating the lighting device, substantially as previously described with respect to an embodiment of FIG. 1, and therefore further explanation may be omitted here.

The controller power source circuit 10 as shown includes the smoothing capacitor C3 and the zener diode ZD1, but is not necessarily so limited. In a simplest example, a configuration to supply charging current via a high resistance from the positive electrode of the capacitor C0 to the positive electrode of the capacitor C3 may be employed. As more efficient power source supply means, a configuration so as to constantly charge the capacitor C3 from the secondary wiring n2 of the inductor L1 may be employed. Additionally, the timing when the current flowing to the inductor L1 becomes substantially zero may be detected by detecting the timing of voltage discharge from the secondary wiring n2 of the inductor L1.

An exemplary dimming operation for the embodiment represented in FIG. 14 may now be described. Here, the average value of the chopper current changes very little even if the load is different. Accordingly, regardless of the load, an effective value of the output current supplied to the load becomes substantially constant by smoothing the pulsation components of the chopper current via the output capacitor C2.

Then, the output current based on duties of the PWM signal can be supplied to the semiconductor light emitting element 4 by intermittently interrupting high-frequency chopper operation on the basis of the low-frequency PWM signal, and thereby dimming can be realized with high precision. For this purpose, in the embodiment of FIG. 17, the switching element Q2 is coupled between the control electrode of the switching element Q1 and the circuit ground, and thus the gate voltage V2 of the switching element Q2 is controlled on the basis of the low-frequency PWM signal.

The low-frequency PWM signal may be, referring back to FIG. 3, supplied from a dimming signal line via the connector CON3 of the lighting device 1 and input to the control circuit 5 via the rectifier circuit 5a, the isolation circuit 5b, and the waveform shaping circuit 5c. In the circuit of FIG. 17, the low-frequency PWM signal output from the waveform shaping circuit 5c becomes the gate voltage V2 of the switching element Q2, and when the gate voltage V2 is High, the switching element Q2 is turned on to short the control electrode of the switching element Q1 to ground. In addition, when the gate voltage V2 is Low, the switching element Q2 is turned off (a high impedance state) equivalent to a non-coupled state.

While the switching element Q2 is turned on, a node between resistor R21 and the switching element Q2 is constantly Low. Accordingly, even when the seventh pin (the gate drive terminal GD) of the controller IC is switched High/Low by the high-frequency wave, the gate drive output is consumed by resistor R21, and thereby the switching element Q1 is maintained in the off-state.

Additionally, in the case where the switching element Q2 is turned off, since the switching element Q1 is switched on/off in accordance with the switching at the high-frequency wave of the seventh pin (the gate drive terminal GD) of the controller IC, the chopper operation will be in a normal state.

Hence, a ratio between a normal chopper operation time period and a disabled chopper operation time period coincides with a ratio between a Low level period and a High level period of the PWM signal. A constant current is supplied in the normal chopper operation time period and a current supply is stopped in the disabled chopper operation time period, and consequently an current depending on a ratio of the Low level period to one cycle of the PWM signal is supplied to the semiconductor light emitting element 4. In this manner, dimming with high precision can be realized.

In addition to (or instead of) the above-mentioned on-off control of the switching element Q2, the oscillating operation of the controller IC may be controlled to be intermittently stopped by shorting the fifth pin (ZCD) of the controller IC to circuit ground in synchronization with the low-frequency PWM signal. As described above, in the case where the L6562 manufactured by the ST Microelectronics Corporation is employed as the controller IC, the disable circuit 55 is coupled to the fifth pin (ZCD) as the zero-cross detection terminal as shown in FIG. 2, and accordingly when the fifth pin is shorted to the ground, the operation of the IC can be disabled. Then, when the low-frequency PWM signal is High, the fifth pin (ZCD) is shorted to ground to disable the IC, and when the low-frequency PWM signal is Low, the fifth pin (ZCD) is opened to return to normal operation. Dimming can be carried out in this manner on the basis of the ratio between the Low- and High-level periods of the low-frequency PWM signal.

An exemplary overall configuration of the LED dimming circuit 1 incorporating the lighting device of FIG. 17 may be substantially equivalent to that shown in FIG. 3 and as previously described above, further explanation being therefore unnecessary here except as below with respect to detail for the control circuit 5.

The variable resistance elements VR1 and VR2A may be formed by variable resistors having a wiper as is known in the art. However, one of or both of them may be replaced by a temperature-sensitive element such as a thermistor whose resistance value changes due to temperature change. A variable resistor with a wiper and a temperature-sensitive element may also be used in combination.

The temperature-sensitive resistance element may detect a temperature of the semiconductor light emitting element 4, an environmental temperature (an ambient temperature of the lighting device), and a temperature of a circuit element such as the inductor L1 and the switching element Q1.

In the case where a light emitting diode (LED) is used as the semiconductor light emitting element 4, it is known that when a temperature of the element is raised, a luminous efficiency is deteriorated. Accordingly, when the control is carried out to prevent lowered output due to rising temperature and the peak value of the current flowing to the switching element Q1 can be increased, the output can be constant.

In addition, in the case where a white light emitting diode is used as the semiconductor light emitting element 4, it is known that a color temperature changes with the magnitude of the current flowing to the element. Accordingly, the magnitude of the current may be controlled by detecting the environment temperature (the ambient temperature of the lighting device) to be changed so that a luminescent color of cold color having a high color temperature can be realized when the environment temperature is high, or so that a luminescent color of warm color having a low color temperature can be realized when the environment temperature is low. In this case, brightness is varied by changing the magnitude of the current flowing to the element. A control operation may be carried out so that only the color temperature can be changed on the basis of the environmental temperature, keeping the effective value of the current flowing to the semiconductor light emitting element 4 constant by omitting the output capacitor C2 and intermittently stopping chopper operation via the switching element Q2.

Moreover, where a temperature of the circuit element such as the inductor L1 and the switching element Q1 is detected and where the detected temperature is very high, a control operation may be carried out so as to protect these circuit elements and to adjust the output to be suppressed.

As the temperature-sensitive element, a thermistor having a positive or negative characteristic may be employed, and other semiconductor temperature-sensitive elements may be used. Regarding whether the temperature characteristic to be employed is positive or negative, where for example a control operation is carried out to prevent the lowered output due to the temperature rising by detecting the element temperature of the semiconductor light emitting element 4, the negative characteristic thermistor is coupled to a portion of the variable resistor VR1 of FIG. 17 or the positive characteristic thermistor is coupled to a portion of the variable resistor VR2.

In a modified example, instead of the variable resistance elements VR1 and/or VR2 as represented in FIG. 17, a semiconductor element whose resistance value varies on the basis of an ambient luminance or the output light of the semiconductor light emitting element 4 may be employed.

For example, in the case where the lighting device of the present invention is used for an outdoor sign lamp, since the ambient luminance is lower at night it is desirable to save the power by lowering the lighting output. In that case, if the variable resistance element VR1 of FIG. 17 is replaced by a photoconductive element such as the CdS to detect the ambient luminance, the current detection sensitivity of the current sensor R1 becomes high at nighttime, and accordingly the lighting output is suppressed. The current detection sensitivity of current sensor R1 then becomes high at daytime, and accordingly the lighting output is raised.

Additionally, where an LED is employed as the semiconductor light emitting element 4, when the temperature of the element is raised the lighting output is lowered due to deterioration of the luminance efficiency. However, if the variable resistance element VR2 of FIG. 17 is replaced by a photoconductive element such as the CdS to detect the ambient luminance, the output can be adjusted so to suppress the variation of the lighting output. Specifically, when the detection value of the lighting output is lowered, the correction value superimposed to the current detection value at turn-on of the switching element Q1 is decreased due to the increasing of the resistance value of the photoconductive element, and accordingly a control operation is carried out so that the peak value of the current flowing to the switching element Q1 can be increased. Even when the LED 4 deteriorates over time, or when the lighting output is lowered due to for example dust or an equivalent effect on the illumination fixture, the output can be adjusted so that the lowering of the lighting output can be cancelled in the same configuration.

Figure 18:
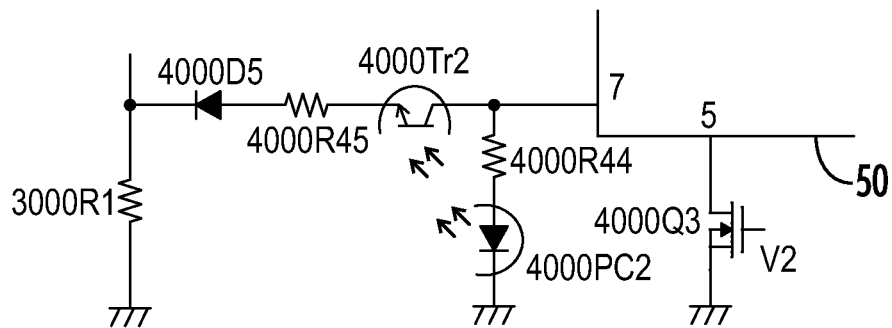
FIG. 18 is a circuit diagram showing an exemplary configuration of circuitry in the lighting device of FIG. 17.
Figure 19:
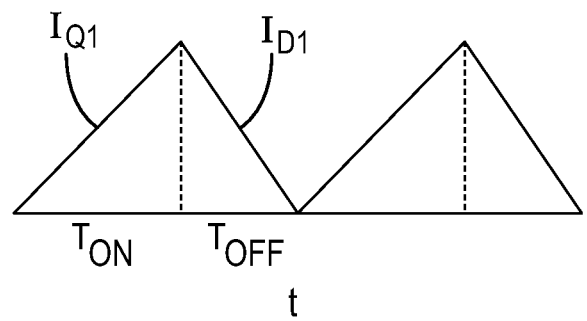
FIG. 19 is a waveform diagram for an exemplary LED lighting device as conventionally known in the art.

Referring now to FIG. 18, a photo coupler PC2 may be used to evaluate the deterioration of the main light source LED 4 over time. The light emitting element of the photo coupler PC2 includes an LED which also deteriorates over time. If power is also supplied to the LED of the photo coupler PC2 during time when the LED 4 is turned on, the lighting output is decreased over time, and accordingly the resistance value of the light-receiving element of the photo coupler PC2 increases over time.

In the example shown in the drawing, a control signal of the seventh pin (the gate drive terminal GD) is supplied to a series circuit including a resistor R44 and the light emitting element of the photo coupler PC2. During an on-time of the switching element Q1 a drive current flows to the light emitting element of the photo coupler PC2 via the resistor R44 due to the High level output voltage of the seventh pin, the electric conductivity of the light-receiving element of the photo coupler PC2 is lowered. Then, the DC signal is superimposed to the current sensor R1 due to the High level output voltage of the seventh pin via the light-receiving element of the photo coupler PC2, the resistor R45, and the diode D5.

Where the light emitting element of the photo coupler PC2 is relatively new the electric conductivity of the light-receiving element of the photo coupler PC2 is sufficiently low, and therefore the DC signal to be superimposed is relatively large, and the peak value of the current flowing to the switching element Q1 can be relatively small. As the light-emitting element of the photo coupler PC2 deteriorates over time, since the lighting output is decreased and thereby the electric conductivity of the light-receiving element of the photo coupler PC2 becomes difficult to further reduce, the DC signal to be superimposed accordingly becomes relatively small, and accordingly the peak value of the current flowing to the switching element Q1 can be relatively large. In this manner, even when the luminance efficiency deteriorates in accordance with aging of the LED 4, the output current can be increased so that the lighting output is sufficient.

In another example, during the period when the PWM signal output from the waveform shaping circuit 5c (with reference back to FIG. 3) is High, the fifth pin of the controller IC is shorted to circuit ground to disable the oscillating operation of the controller IC. Other configurations may be employed similarly to previous embodiments.

As described above, in the case where the L6562 manufactured by the ST Microelectronics Corporation is employed as the controller IC, the disable circuit 55 is coupled to the fifth pin (ZCD) serving as the zero-cross detection terminal as shown in FIG. 2, and when the fifth pin is shorted to the ground, operation of the IC can be disabled. Then, when the low-frequency PWM signal (the gate voltage V2 of the switching element Q2 of FIG. 17) is High, the switching element Q3 of FIG. 18 is turned on, operation of the IC is disabled by shorting the fifth pin (ZCD) to ground, and thereby the gate drive signal is not output from the gate drive terminal GD (the seventh pin).

In a dimming operation, a period when a high-frequency pulse current flows to the light emitting element of the photo coupler PC2 becomes short as the dimming level is lowered, and thus deterioration of the light emitting element of the photo coupler PC2 is slowed. Accordingly, even if the total lighting time of the semiconductor light emitting element 4 is long, the luminance correction slowly progresses in the case where a period of the dimming lighting is long.

In the above-described embodiment and various modified examples, the switching element Q1 of the step-down chopper circuit 3 is described as being arranged on the lower potential side. However, referring again to FIG. 5(a), it may be understood that the present invention can be also applied to the case where the switching element Q1 of the step-down chopper circuit 3a is arranged on a higher potential side. In addition, the present invention can be applied to various types of switching power source circuit as shown in FIGS. 5(b) to 5(d), and as previously described in detail.

An embodiment of the LED lighting device of FIG. 17 and any modified examples may further be configured as the LED illumination fixture having a separate power source in the same manner as those previously described and further details are omitted as redundant with respect to the above-mentioned explanation of FIG. 6.

The previous detailed description has been provided for the purposes of illustration and description. Thus, although there have been described particular embodiments of the present invention of a new and useful "LED Lighting Device with Chopper Circuit and Dimming Control Method," it is not intended that such references be construed as limitations upon the scope of this invention except as set forth in the following claims.

What is claimed is:

1. An LED lighting device comprising:
   a DC power source having positive and negative output terminals;
   a switching element coupled across the output terminals of the DC power source;
   an inductor coupled on a first end to the switching element and effective to receive and store energy when the switching element is turned on;
   a lighting device output connector coupled to a second end of the inductor and effective to receive a semiconductor light emitting element;
   a regeneration diode coupled to the node between the inductor and the switching element and effective to discharge energy stored in the inductor to the output connector when the switching element is turned off;
   a current sensor effective to detect current flowing to the switching element; and
   a control circuit effective in a normal operation to
      receive the detected current value from the current sensor;
      compare the detected current value to a predetermined value;
      decrease a gate drive signal to turn off the switching element when the detected current value reaches the predetermined value; and
      increase a gate drive signal to turn on the switching element when energy discharge of the inductor is completed;
   the control circuit further effective in a dimming operation to
      receive a dimming control signal, and
      intermittently disable the normal operation in accordance with the dimming control signal.

2. The lighting device of claim 1, the control circuit effective in the dimming operation to intermittently disable the normal operation by adjusting the predetermined value in accordance with the dimming control signal.

3. The lighting device of claim 2, the dimming control signal comprising a low-frequency PWM signal, the control circuit effective in the dimming operation to adjust the predetermined value in accordance with a duty ratio of the low-frequency PWM signal.

4. The lighting device of claim 1, the control circuit effective in the dimming operation to intermittently disable the normal operation by shorting a control electrode of the switching element to circuit ground in accordance with the dimming control signal.

5. The lighting device of claim 4, the dimming control signal comprising a low-frequency PWM signal, the control circuit effective in the dimming operation to intermittently disable the normal operation by shorting a control electrode of the switching element to circuit ground in accordance with a duty ratio of the low-frequency PWM signal.

6. The lighting device of claim 5, the switching element comprising a first switching element and the control circuit further comprising a second switching element coupled to the control electrode of the first switching element,
   the second switching element effective to receive the low-frequency PWM signal at a control electrode and thereby to short the control electrode of the first switching element to circuit ground in accordance with the duty ratio of the PWM signal.

7. The lighting device of claim 1, the dimming control signal comprising a low-frequency PWM signal, the control circuit effective in the dimming operation to intermittently disable the normal operation by superposing a value larger than the predetermined value to the detected current value in accordance with the duty ratio of the PWM signal.

8. The lighting device of claim 1, the dimming operation comprising first and second dimming control modes, the control mode for a given dimming operation determined based on a comparison of a predetermined dimming output level to a current lighting output level,
   the control circuit effective in a first mode to intermittently disable the normal operation by shorting a control electrode of the switching element to circuit ground in accordance with the dimming control signal, and
   the control circuit effective in a second mode to intermittently disable the normal operation by adjusting the predetermined value in accordance with the dimming control signal.

9. An LED lighting device for a video camera having a shutter speed, the lighting device comprising:
   a DC power source having positive and negative output terminals;
   a switching element coupled across the output terminals of the DC power source;
   an inductor coupled on a first end to the switching element and effective to receive and store energy when the switching element is turned on;
   a lighting device output connector coupled to a second end of the inductor and effective to receive a semiconductor light emitting element;
   a regeneration diode coupled to the node between the inductor and the switching element and effective to discharge energy stored in the inductor to the output connector when the switching element is turned off;
   a current sensor effective to detect current flowing to the switching element; and
   a control circuit effective in a normal operation to
      receive the detected current value from the current sensor;
      compare the detected current value to a predetermined value;
      decrease a gate drive signal to turn off the switching element when the detected current value reaches the predetermined value; and
      increase a gate drive signal to turn on the switching element when energy discharge of the inductor is completed;
   the control circuit further effective in a dimming operation to
      receive a PWM dimming control signal having a frequency set to an integral multiple of an inverse of shutter speed of the video camera, and
      intermittently disable the normal operation in accordance with the dimming control signal.

10. The lighting device of claim 9, the control circuit further effective to receive a synchronization signal associated with an exposure period for the video camera, and further to disable the normal and dimming operations based on the synchronization signal.

11. The lighting device of claim 10, wherein the PWM signal is switched in synchronization with the electric shutter of the video camera and energy is provided to the output connector only during the exposure period in synchronization with a timing of the electronic shutter of the video camera.

12. The lighting device of claim 10, the control circuit effective in the dimming operation to intermittently disable the normal operation by adjusting the predetermined value in accordance with the PWM dimming control signal.

13. The lighting device of claim 10, the control circuit effective in the dimming operation to intermittently disable the normal operation by shorting a control electrode of the switching element to circuit ground in accordance with the PWM dimming control signal.

14. The lighting device of claim 13, the switching element comprising a first switching element and the control circuit further comprising a second switching element coupled to the control electrode of the first switching element, the second switching element effective to receive the PWM signal at a control electrode and thereby to short the control electrode of the first switching element to circuit ground in accordance with the PWM signal.

15. The lighting device of claim 10, the control circuit effective in the dimming operation to intermittently disable the normal operation by superposing a value larger than the predetermined value to the detected current value in accordance with the PWM signal.

16. The lighting device of claim 10, the dimming operation comprising first and second dimming control modes, the control mode for a given dimming operation determined based on a comparison of a predetermined dimming output level to a current lighting output level, the control circuit effective in a first mode to intermittently disable the normal operation by shorting a control electrode of the switching element to circuit ground in accordance with the PWM signal, and the control circuit effective in a second mode to intermittently disable the normal operation by adjusting the predetermined value in accordance with the PWM signal.

17. A method of controlling lighting output for a lighting device mounted on a video camera, the method comprising:

identifying a shutter speed associated with the video camera;

providing the lighting device with a chopper circuit further comprising a switching element and an inductance element, the chopper circuit effective to convert an input DC signal into an output signal for powering a semiconductor light emitting element;

detecting a current value to the switching element;

comparing the detected current value to a predetermined value;

decreasing a gate drive signal to turn off the switching element when the detected current value reaches the predetermined value;

increasing a gate drive signal to turn on the switching element when energy discharge of the inductor is completed, the steps of decreasing and increasing the gate drive signal defining a normal operation for the lighting device;

providing a PWM dimming control signal having a frequency set to an integral multiple of an inverse of shutter speed of the video camera; and intermittently interrupting operation of the switching element in accordance with the PWM dimming control signal, the interrupting step defining a dimming operation for the lighting device.

18. The method of claim 17, further comprising the steps of:

receiving a synchronization signal associated with an exposure period for the video camera; and disabling the normal and dimming operations based on the synchronization signal, wherein the PWM signal is switched in synchronization with the electric shutter of the video camera and energy is provided to the output connector only during the exposure period in synchronization with a timing of the electronic shutter of the video camera.

19. The method of claim 17, the step of intermittently disabling the normal operation further comprising adjusting the predetermined value in accordance with the PWM dimming control signal.

20. The method of claim 17, the step of intermittently disabling the normal operation further comprising shorting a control electrode of the switching element to circuit ground in accordance with the PWM dimming control signal.

* * * * *

UNITED STATES PATENT AND TRADEMARK OFFICE
CERTIFICATE OF CORRECTION

| | | |
|---|---|---|
| PATENT NO. | : 8,664,883 B2 | Page 1 of 1 |
| APPLICATION NO. | : 13/187321 | |
| DATED | : March 4, 2014 | |
| INVENTOR(S) | : Hiramatu et al. | |

It is certified that error appears in the above-identified patent and that said Letters Patent is hereby corrected as shown below:

On the title page item (30) Foreign Application Priority Data should include:

"July 20, 2010 .......................................................... JP2010-184909
  September 16, 2010 ............................................... JP2010-207583"

Signed and Sealed this
Fourth Day of August, 2015

Michelle K. Lee
*Director of the United States Patent and Trademark Office*